(12) United States Patent
Amemiya

(10) Patent No.: US 11,204,812 B2
(45) Date of Patent: Dec. 21, 2021

(54) INFORMATION PROCESSING APPARATUS AND DISTRIBUTED PROCESSING SYSTEM

(71) Applicant: FUJITSU LIMITED, Kawasaki (JP)

(72) Inventor: Kouichirou Amemiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 75 days.

(21) Appl. No.: 16/853,313

(22) Filed: Apr. 20, 2020

(65) Prior Publication Data

US 2020/0341819 A1    Oct. 29, 2020

(30) Foreign Application Priority Data

Apr. 26, 2019  (JP) .............................. JP2019-085417

(51) Int. Cl.
*G06F 9/50* (2006.01)
*G06F 9/30* (2018.01)

(52) U.S. Cl.
CPC ........ *G06F 9/5083* (2013.01); *G06F 9/30047* (2013.01); *G06F 9/5016* (2013.01); *G06F 9/5038* (2013.01); *G06F 2209/508* (2013.01)

(58) Field of Classification Search
CPC .. G06F 9/5083; G06F 9/30047; G06F 9/5016; G06F 9/5038; G06F 2209/508
See application file for complete search history.

(56) References Cited

U.S. PATENT DOCUMENTS

| | | | |
|---|---|---|---|
| 2007/0038738 A1* | 2/2007 | Iyengar | G06F 11/3466 709/224 |
| 2007/0220139 A1 | 9/2007 | Ohta et al. | |
| 2015/0249581 A1* | 9/2015 | Fujiyama | H04L 67/10 709/224 |

FOREIGN PATENT DOCUMENTS

| | | |
|---|---|---|
| JP | 2007-257049 A | 10/2007 |
| JP | 2009-503686 A | 1/2009 |
| WO | 2015/075962 A1 | 5/2015 |

* cited by examiner

*Primary Examiner* — Sisley N Kim
(74) *Attorney, Agent, or Firm* — Fujitsu Patent Center

(57) ABSTRACT

An information processing apparatus includes: a processor configured to: identify first data based on a history of accessing data in a past; obtain first load information from other apparatuses at a first time interval; identify second data based on the first load information and second load information of the information processing apparatus, the second data being stored in a memory; obtain third load information from a first apparatus that holds the first data and one or more second apparatuses that hold respective pieces of the second data at a second time interval shorter than the first time interval; and determine, when the first data is accessed, whether the first data is to be stored in the memory and which piece of the second data is to be deleted when temporarily storing the first data in the memory, based on the third load information and the second load information.

7 Claims, 39 Drawing Sheets

(EDGE LOADS ARE EVEN)

(LOAD OF DATA HOLDING EDGE SERVER IS HIGH)

*WHICH SERVER PERFORMS PROCESSING DEPENDS ON CALCULATION RESULT (LOAD OF PROCESSING ACCEPTING EDGE SERVER IS HIGH)

(EDGE LOADS ARE EVEN)

(LOAD OF DATA HOLDING EDGE SERVER IS HIGH)

(LOAD OF PROCESSING ACCEPTING EDGE SERVER IS HIGH)

*WHICH SERVER PERFORMS PROCESSING DEPENDS ON CALCULATION RESULT (EDGE LOADS ARE EVEN)

(LOAD OF DATA HOLDING EDGE SERVER IS HIGH)

(LOAD OF PROCESSING ACCEPTING EDGE SERVER IS HIGH)

*WHICH SERVER PERFORMS PROCESSING DEPENDS ON CALCULATION RESULT

FIG. 11A

| | EDGE SERVER i (HOLDING CACHE) | EDGE SERVER j (HOLDING DATA A) | EDGE SERVER k (HOLDING DATA B) |
|---|---|---|---|
| DATA PROCESSING LOAD TOTAL AMOUNT | $\pi_i$ | $\pi_j$ | $\pi_k$ |
| DATA ACCESS LOAD TOTAL AMOUNT | $\delta_i$ | $\delta_j$ | $\delta_k$ |

FIG. 11B

| | EDGE SERVER i (HOLDING CACHE) | EDGE SERVER j (HOLDING DATA A) | EDGE SERVER k (HOLDING DATA B) |
|---|---|---|---|
| DATA PROCESSING LOAD TOTAL AMOUNT | $\pi_i' = \pi_i$ | $\pi_j' = \pi_j$ | $\pi_k' = \pi_k$ |
| DATA ACCESS LOAD TOTAL AMOUNT | $\delta_i' = \delta_i \left( \delta_i^A + \dfrac{\delta_{\#i}^A}{c^A+1} \right) - \left( \delta_i^B + \dfrac{\delta_{\#i}^B}{c^B} \right)$ | $\delta_j' = \delta_j - \delta_i^A - \dfrac{\delta_{\#i}^A}{c^A} + \dfrac{\delta_{\#i}^A}{c^A(c^A+1)}$ $= \delta_j - \delta_i^A - \dfrac{\delta_{\#i}^A}{c^A(c^A+1)}$ | $\delta_k' = \delta_k + \delta_i^B - \dfrac{\delta_{\#i}^B}{c^B} + \dfrac{\delta_{\#i}^B}{c^B(c^B-1)}$ $= \delta_k + \delta_i^B + \dfrac{\delta_{\#i}^B}{c^B(c^B-1)}$ |

FIG. 12A

| | PROCESSING OF DATA A IN EDGE SERVER i | PROCESSING OF DATA B IN EDGE SERVER i |
|---|---|---|
| PROCESSING THROUGHPUT | $TP_i^A = \min(TP^{A,\pi,i}, TP^{A,\delta,i})$ | $TP_i^B = \min(TP^{B,\pi,i}, TP^{B,\delta,i})$ |
| DATA ACCESS THROUGHPUT | $\begin{cases} TP^{A,\delta,i} = \delta_i^A (\delta_j \leq \Delta_j) \\ TP^{A,\delta,i} = \dfrac{\delta_i}{\Delta_j} \delta_i^A (\delta_j > \Delta_j) \end{cases}$ | $\begin{cases} TP^{B,\delta,i} = \delta_i^B (\delta_j \leq \Delta_j) \\ TP^{B,\delta,i} = \dfrac{\delta_j}{\Delta_j} \delta_i^B (\delta_j > \Delta_j) \end{cases}$ |
| DATA PROCESSING THROUGHPUT | $\begin{cases} TP^{A,\pi,i} = \pi_i^A (\pi_i' \leq \Pi_i) \\ TP^{A,\pi,i} = \dfrac{\pi_i}{\Pi_i} \pi_i^A (\pi_i > \Pi_i) \end{cases}$ | $\begin{cases} TP^{B,\pi,i} = \pi_i^A (\pi_i' \leq \Pi_i) \\ TP^{B,\pi,i} = \dfrac{\pi_i}{\Pi_i} \pi_i^A (\pi_i > \Pi_i) \end{cases}$ |

FIG. 12B

| | PROCESSING OF DATA A IN EDGE SERVER i | PROCESSING OF DATA B IN EDGE SERVER i |
|---|---|---|
| PROCESSING THROUGHPUT | $TP_i'^A = \min(TP^{A,\pi,i}, TP^{A,\delta,i})$ | $TP_i'^B = \min(TP^{B,\pi,i}, TP^{B,\delta,i})$ |
| DATA ACCESS THROUGHPUT | $\begin{cases} TP^{A,\delta',i} = \delta_i^A (\delta_i' \leq \Delta_j) \\ TP^{A,\delta',i} = \dfrac{\delta_i'}{\Delta_j} \delta_i^A (\delta_i' > \Delta_j) \end{cases}$ | $\begin{cases} TP^{B,\delta',i} = \delta_i^B (\delta_k' \leq \Delta_k) \\ TP^{B,\delta',i} = \dfrac{\delta_k'}{\Delta_k} \delta_i^B (\delta_k' > \Delta_k) \end{cases}$ |
| DATA PROCESSING THROUGHPUT | $\begin{cases} TP^{A,\pi',i} = \pi_i^A (\pi_i' \leq \Pi_i) \\ TP^{A,\pi',i} = \dfrac{\pi_i'}{\Pi_i} \pi_i^A (\pi_i' > \Pi_i) \end{cases}$ | $\begin{cases} TP^{B,\pi',i} = \pi_i^A (\pi_i' \leq \Pi_i) \\ TP^{B,\pi',i} = \dfrac{\pi_i'}{\Pi_i} \pi_i^A (\pi_i' > \Pi_i) \end{cases}$ |

FIG. 13B

| | EDGE SERVER i (HOLDING CACHE) | EDGE SERVER j (HOLDING DATA A) | EDGE SERVER k (HOLDING DATA B) |
|---|---|---|---|
| DATA PROCESSING LOAD TOTAL AMOUNT | $\pi'_i = \pi_i$ | $\pi'_j = \pi_j$ | $\pi'_k = \pi_k$ |
| DATA ACCESS LOAD TOTAL AMOUNT | $\delta'_i = \delta_i \left( \delta^A_i + \dfrac{\delta^A_{\#i}}{c^A + 1} \right) - \left( \delta^B_i + \dfrac{\delta^B_{\#i}}{c^B} \right)$ | $\delta'_j = \delta_j + \delta^A_i - \dfrac{\delta^A_{\#i}}{c^A} + \dfrac{\delta^A_{\#i}}{(c^A + 1)}$ $= \delta_j + \dfrac{\delta^A_{\#i}}{c^A(c^A + 1)}$ | $\delta'_k = \delta_k + \delta^B_i - \dfrac{\delta^B_{\#i}}{c^B} + \dfrac{\delta^B_{\#i}}{(c^B - 1)}$ $= \delta_k + \dfrac{\delta^B_{\#i}}{c^B(c^B - 1)}$ |

FIG. 14

| | PROCESSING OF DATA A IN EDGE SERVER i | PROCESSING OF DATA B IN EDGE SERVER i |
|---|---|---|
| PROCESSING THROUGHPUT | $TP_i'^A = \min(TP^{A,\pi',i}, TP^{A,\delta',i})$ | $TP_i^B = \min(TP^{B,\pi,i}, TP^{B,\delta',i})$ |
| DATA ACCESS THROUGHPUT | $\begin{cases} TP^{A,\delta',i} = \delta_i^A (\delta_i' \leq \Delta_i) \\ TP^{A,\delta',i} = \dfrac{\delta_i'}{\Delta_j} \delta_i^A (\delta_i' > \Delta_j) \end{cases}$ | $\begin{cases} TP^{B,\delta',i} = \delta_k^B (\delta_k' \leq \Delta_k) \\ TP^{B,\delta',i} = \dfrac{\delta_k'}{\Delta_k} \delta_k^B (\delta_k' > \Delta_k) \end{cases}$ |
| DATA PROCESSING THROUGHPUT | $\begin{cases} TP^{A,\pi,i} = \pi_i^A (\pi_i \leq \Pi_i) \\ TP^{A,\pi,i} = \dfrac{\pi_i}{\Pi_i} \pi_i^A (\pi_i > \Pi_i) \end{cases}$ | $\begin{cases} TP^{B,\pi,i} = \pi_i^A (\pi_i \leq \Pi_i) \\ TP^{B,\pi,i} = \dfrac{\pi_i}{\Pi_i} \pi_i^A (\pi_i > \Pi_i) \end{cases}$ |

FIG. 16A

| | EDGE SERVER i (HOLDING CACHE) | EDGE SERVER j (HOLDING DATA A) | EDGE SERVER k (HOLDING DATA B) |
|---|---|---|---|
| DATA PROCESSING LOAD TOTAL AMOUNT | $\pi_i$ | $\pi_j$ | $\pi_k$ |
| DATA ACCESS LOAD TOTAL AMOUNT | $\delta_i$ | $\delta_j$ | $\delta_k$ |

FIG. 16B

| | EDGE SERVER i (HOLDING CACHE) | EDGE SERVER j (HOLDING DATA A) | EDGE SERVER k (HOLDING DATA B) |
|---|---|---|---|
| DATA PROCESSING LOAD TOTAL AMOUNT | $\pi'_i = \pi_i + \pi_i^A$ | $\pi'_j = \pi_j + \pi_i^A$ | $\pi'_k = \pi_k$ |
| DATA ACCESS LOAD TOTAL AMOUNT | $\delta'_i = \delta_i \left( \delta_i^A + \dfrac{\delta_{\#i}^A}{c^A+1} \right) - \left( \delta_i^B + \dfrac{\delta_{\#i}^B}{c^B} \right)$ | $\delta'_j = \delta_j - \delta_i^A + \dfrac{\delta_{\#i}^A}{c^A} + \dfrac{\delta_{\#i}^A}{c^A(c^A+1)}$ $= \delta_j - \delta_i^A - \dfrac{\delta_{\#i}^A}{c^A(c^A+1)}$ | $\delta'_k = \delta_k + \delta_i^B + \dfrac{\delta_{\#i}^B}{c^B} - \dfrac{\delta_{\#i}^B}{c^B(c^B-1)}$ $= \delta_k + \delta_i^B + \dfrac{\delta_{\#i}^B}{c^B(c^B-1)}$ |

FIG. 17A

| | PROCESSING OF DATA A IN EDGE SERVER i | PROCESSING OF DATA B IN EDGE SERVER i |
|---|---|---|
| PROCESSING THROUGHPUT | $TP_i^A = \min(TP^{A,\pi,i}, TP^{A,\delta,i})$ | $TP_i^B = \min(TP^{B,\pi,i}, TP^{B,\delta,i})$ |
| DATA ACCESS THROUGHPUT | $\begin{cases} TP^{A,\delta,i} = \delta_i^A & (\delta_j \leq \Delta_j) \\ TP^{A,\delta,i} = \dfrac{\delta_j}{\Delta_j}\delta_i^A & (\delta_j > \Delta_j) \end{cases}$ | $\begin{cases} TP^{B,\delta,i} = \delta_i^B & (\delta_j \leq \Delta_j) \\ TP^{B,\delta,i} = \dfrac{\delta_j}{\Delta_j}\delta_i^B & (\delta_j > \Delta_j) \end{cases}$ |
| DATA PROCESSING THROUGHPUT | $\begin{cases} TP^{A,\pi,i} = \pi_i^A & (\pi_i \leq \Pi_i) \\ TP^{A,\pi,i} = \dfrac{\pi_i}{\Pi_i}\pi_i^A & (\pi_i > \Pi_i) \end{cases}$ | $\begin{cases} TP^{B,\pi,i} = \pi_i^A & (\pi_i \leq \Pi_i) \\ TP^{B,\pi,i} = \dfrac{\pi_i}{\Pi_i}\pi_i^A & (\pi_i > \Pi_i) \end{cases}$ |

FIG. 17B

| | PROCESSING OF DATA A IN EDGE SERVER i | PROCESSING OF DATA B IN EDGE SERVER i |
|---|---|---|
| PROCESSING THROUGHPUT | $TP_i'^A = \min(TP^{A,\pi',i}, TP^{A,\delta',i})$ | $TP_i'^B = \min(TP^{B,\pi',i}, TP^{B,\delta',i})$ |
| DATA ACCESS THROUGHPUT | $\begin{cases} TP^{A,\delta',i} = \delta_i^A & (\delta_i' \leq \Delta_j) \\ TP^{A,\delta',i} = \dfrac{\delta_i'}{\Delta_j}\delta_i^A & (\delta_i' > \Delta_j) \end{cases}$ | $\begin{cases} TP^{B,\delta',i} = \delta_i^B & (\delta_k' \leq \Delta_k) \\ TP^{B,\delta',i} = \dfrac{\delta_k'}{\Delta_k}\delta_i^B & (\delta_k' > \Delta_k) \end{cases}$ |
| DATA PROCESSING THROUGHPUT | $\begin{cases} TP^{A,\pi',i} = \pi_i^A & (\pi_i' \leq \Pi_i) \\ TP^{A,\pi',i} = \dfrac{\pi_i'}{\Pi_i}\pi_i^A & (\pi_i' > \Pi_i) \end{cases}$ | $\begin{cases} TP^{B,\pi',i} = \pi_i^A & (\pi_i' \leq \Pi_i) \\ TP^{B,\pi',i} = \dfrac{\pi_i'}{\Pi_i}\pi_i^A & (\pi_i' > \Pi_i) \end{cases}$ |

FIG. 18B

| | EDGE SERVER i (CACHE RETENTION) | EDGE SERVER j (DATA A RETENTION) | EDGE SERVER k (DATA B RETENTION) |
|---|---|---|---|
| DATA PROCESSING LOAD TOTAL AMOUNT | $\pi'_i = \pi_i + \pi_i^A - \pi_i^B$ | $\pi'_j = \pi_j + \pi_i^A$ | $\pi'_k = \pi_k + \pi_i^B$ |
| DATA ACCESS LOAD TOTAL AMOUNT | $\delta'_i = \delta_i \left( \delta_i^A + \dfrac{\delta_{\#i}^A}{c^A+1} \right) - \left( \delta_i^B + \dfrac{\delta_{\#i}^B}{c^B} \right)$ | $\delta'_j = \delta_j - \delta_i^A - \dfrac{\delta_{\#i}^A}{c^A} + \dfrac{\delta_{\#i}^A}{c^A(c^A+1)}$ $= \delta_j - \delta_i^A - \dfrac{\delta_{\#i}^A}{c^A(c^A+1)}$ | $\delta'_k = \delta_k + \delta_i^B - \dfrac{\delta_{\#i}^B}{c^B} + \dfrac{\delta_{\#i}^B}{c^B(c^B-1)}$ $= \delta_k + \delta_i^B + \dfrac{\delta_{\#i}^B}{c^B(c^B-1)}$ |

FIG. 19

|  | PROCESSING OF DATA A IN EDGE SERVER i | PROCESSING OF DATA B IN EDGE SERVER i |
|---|---|---|
| PROCESSING THROUGHPUT | $TP_i'^A = \min(TP^{A,\pi,i}, TP^{A,\delta',i})$ | $TP_i^B = \min(TP^{B,\pi,i}, TP^{B,\delta',i})$ |
| DATA ACCESS THROUGHPUT | $\begin{cases} TP^{A,\delta',i} = \delta_i^A (\delta_i' \leq \Delta_i) \\ TP^{A,\delta',i} = \dfrac{\delta_i'}{\Delta_j} \delta_i^A (\delta_i' > \Delta_j) \end{cases}$ | $\begin{cases} TP^{B,\delta',i} = \delta_i^B (\delta_k' \leq \Delta_k) \\ TP^{B,\delta',i} = \dfrac{\delta_k'}{\Delta_k} \delta_i^B (\delta_k' > \Delta_k) \end{cases}$ |
| DATA PROCESSING THROUGHPUT | $\begin{cases} TP^{A,\pi,i} = \pi_i^A (\pi_i \leq \Pi_i) \\ TP^{A,\pi,i} = \dfrac{\pi_i}{\Pi_i} \pi_i^A (\pi_i > \Pi_i) \end{cases}$ | $\begin{cases} TP^{B,\pi,i} = \pi_i^A (\pi_i \leq \Pi_i) \\ TP^{B,\pi,i} = \dfrac{\pi_i}{\Pi_i} \pi_i^A (\pi_i > \Pi_i) \end{cases}$ |

FIG. 20

| | PROCESSING THROUGHPUT |
|---|---|
| PROCESSING OF DATA A IN OTHER EDGE SERVER | $\begin{cases} TP^A_{\neq i} = \lambda^A_{\neq i} \left( \lambda^A_{\neq i} \leq \sum_{edge\ with\ data\ A} \Delta_M \right) \\ TP^A_{\neq i} = \sum_{edge\ with\ data\ A} \Delta_M \left( \lambda^A_{\neq i} > \sum_{edge\ with\ data\ A} \Delta_M \right) \end{cases}$ |
| PROCESSING OF DATA B IN OTHER EDGE SERVER | $\begin{cases} TP^B_{\neq i} = \lambda^B_{\neq i} \left( \lambda^B_{\neq i} \leq \sum_{edge\ with\ data\ B} \Delta_M \right) \\ TP^B_{\neq i} = \sum_{edge\ with\ data\ B} \Delta_M \left( \lambda^B_{\neq i} > \sum_{edge\ with\ data\ B} \Delta_M \right) \end{cases}$ |

WHERE $\lambda^A_{\neq i} = \sum_{l \in all\ nodes} \lambda^A_l - \lambda^A_i$ $\lambda^B_{\neq i} = \sum_{l \in all\ nodes} \lambda^B_l - \lambda^B_i$

FIG. 23

| DATA ID | DATA ATTRIBUTE 1 | ... | DATA ATTRIBUTE n | DATA LOCATION | ACCESS STATISTIC |
|---|---|---|---|---|---|
| DataA | 10 | ... | 20 | [EC#1:27017/raw_data_db::True, ES#4:27017/data_db::False, ES#9:27017/data_db::False] | 1000 |
| DataB | 100 | ... | 30 | [EC#2:27017/raw_data_db:True, ES#5:27017/dat_db:False] | 500 |
| ... | ... | ... | ... | ... | ... |

FIG. 25A

| EDGE SERVER ID | ⊓ | Δ | π | δ |
|---|---|---|---|---|
| EC#1 | 100 | 100 | 10 | 10 |
| EC#2 | 100 | 100 | 60 | 40 |
| ... | ... | ... | ... | ... |

FIG. 25B

| DATA ID | ACCESS STATISTIC OF ITS OWN APPARATUS | ACCESS STATISTIC OF ENTIRE SYSTEM |
|---|---|---|
| DataA | 100 | 1000 |
| DataB | 10 | 500 |
| ... | ... | ... |

FIG. 25C

| DATA ID | PATH | ACCESS STATISTIC |
|---|---|---|
| DataB | /cache/dataa/xxx | 100 |
| ... | ... | ... |

| EDGE SERVER ID |
|---|
| EC#1 |
| EC#2 |
| ... |

| EDGE SERVER ID | Π | Δ | π | δ |
|---|---|---|---|---|
| EC#1 | 100 | 100 | 10 | 10 |
| EC#2 | 100 | 100 | 60 | 40 |
| ... | ... | ... | ... | ... |

FIG. 27A

| FIELD | VALUE | |
|---|---|---|
| DESTINATION ADDRESS | ADDRESS OF PROCESSING ACCEPTING EDGE SERVER:Port | |
| TRANSMISSION SOURCE ADDRESS | ADDRESS OF PROCESSING ISSUANCE TERMINAL:Port | |
| APP Path | /APL1 | |
| BODY | DESCRIBE PROCESSING TARGET DATA AND PROCESSING CONTENTS (DIRECTED ACYCLIC GRAPH (DAG) OR THE LIKE WHERE DATA SOURCE AND PROCESSING ARE REPRESENTED AS NODES) | |
| | ID | PROCESSING ID |
| | PROCESSING DAG | [<br>{src:"data A",dst:"process1"}<br>{src:"data B",dst:"process2"}<br>{src:"process1",dst:"process3"}<br>{src:"process2",dst:"process3"}<br>{src:"process3",dst:"result"}<br>] |

FIG. 27B

| FIELD | VALUE |
|---|---|
| DESTINATION ADDRESS | ADDRESS OF PROCESSING ISSUANCE TERMINAL:Port |
| TRANSMISSION SOURCE ADDRESS | ADDRESS OF PROCESSING ACCEPTING EDGE SERVER:Port |
| PROCESSING RESPONCE | PROCESSING RESULT |

FIG. 28A

| FIELD | VALUE | |
|---|---|---|
| DESTINATION ADDRESS | ADDRESS OF PROCESSING EXECUTION EDGE SERVER:Port | |
| TRANSMISSION SOURCE ADDRESS | ADDRESS OF PROCESSING EXECUTION REQUEST EDGE SERVER :Port | |
| APP Path | /APL1 | |
| BODY | DESCRIBE PROCESSING TARGET DATA AND PROCESSING CONTENTS (DIRECTED ACYCLIC GRAPH (DAG) OR THE LIKE WHERE DATA SOURCE AND PROCESSING ARE REPRESENTED AS NODES) | |
| | ID | PROCESSING ID |
| | PROCESSING DAG | [ {src:"data A",dst:"process1"} {src:"data B",dst:"process2"} {src:"process1",dst:"process3"} {src:"process2",dst:"process3"} {src:"process3",dst:"result"} ] |

FIG. 28B

| FIELD | VALUE |
|---|---|
| DESTINATION ADDRESS | ADDRESS OF PROCESSING EXECUTION REQUEST EDGE SERVER :Port |
| TRANSMISSION SOURCE ADDRESS | ADDRESS OF PROCESSING EXECUTION EDGE SERVER:Port |
| PROCESSING RESPONCE | PROCESSING RESULT |

FIG. 29A

| FIELD | VALUE | |
|---|---|---|
| DESTINATION ADDRESS | ADDRESS OF DATA HOLDING EDGE SERVER:Port | |
| TRANSMISSION SOURCE ADDRESS | ADDRESS OF DATA REQUEST EDGE SERVER:Port | |
| DB NAME | DATA STORAGE DATABASE NAME | |
| BODY | DATA REQUEST Query | |
| | ID | REQUEST Sequence NUMBER |
| | Query | DATA REQUEST QUERY {"id":{"Seq":10}} (REQUEST FOR ENTRY HAVING ID = 10) |

FIG. 29B

| FIELD | VALUE |
|---|---|
| DESTINATION ADDRESS | ADDRESS OF DATA REQUEST EDGE SERVER:Port |
| TRANSMISSION SOURCE ADDRESS | ADDRESS OF DATA HOLDING EDGE SERVER:Port |
| DATA | REQUESTED DATA |

FIG. 30A

| FIELD | VALUE | |
|---|---|---|
| DESTINATION ADDRESS | ADDRESS OF DATA/Cache LOCATION MANAGEMENT SERVER:Port | |
| TRANSMISSION SOURCE ADDRESS | ADDRESS OF DATA/Cache LOCATION REQUEST EDGE SERVER:Port | |
| BODY | DATA/Cache LOCATION REQUEST Query | |
| | ID | REQUEST Sequence NUMBER |
| | Query | DATA REQUEST QUERY {"id":{"Seq":10}}(REQUEST FOR LOCATION OF ENTRY HAVING ID = 10) |

FIG. 30B

| FIELD | VALUE |
|---|---|
| DESTINATION ADDRESS | ADDRESS OF DATA REQUEST EDGE SERVER:Port |
| TRANSMISSION SOURCE ADDRESS | ADDRESS OF DATA HOLDING EDGE SERVER:Port |
| DATA POSITION | END POINT LIST OF EDGE SERVER HOLDING DATA/Cache AND ACCESS STATISTIC<br>{<br>  "endpoints":[<br>  {"Address":"ES#1","Port":27017,"DB":"db"},<br>  {"Address":"ES#5","Port":27017,"DB":"db"},<br>  ],<br>  "access_statistics":1000<br>} |

FIG. 30C

| FIELD | VALUE |
|---|---|
| DESTINATION ADDRESS | ADDRESS OF RESOURCE INFORMATION TRANSMISSION DESTINATION EDGE SERVER |
| TRANSMISSION SOURCE ADDRESS | ADDRESS OF RESOURCE INFORMATION TRANSMISSION SOURCE EDGE SERVER |
| BODY | RESOURCE INFORMATION,PROCESSING LOAD($\pi$),DATA DISTRIBUTION LOAD($\delta$),PROCESSING Capacity($\Pi$),AND DATA DISTRIBUTION Capacity($\Delta$)<br>{"process_capacity":100,"data_deliver_capacity":100,<br>"process_load":10,"data_deliver_load":10} |

FIG. 37

| DATA ID | ID OF EDGE SERVER IN CHARGE OF MANAGEMENT |
|---------|-------------------------------------------|
| DataX   | ES#4                                      |
| DataY   | ES#5                                      |
| DataZ   | ES#5                                      |

INFORMATION PROCESSING APPARATUS AND DISTRIBUTED PROCESSING SYSTEM

CROSS-REFERENCE TO RELATED APPLICATION

This application is based upon and claims the benefit of priority of the prior Japanese Patent Application No. 2019-85417, filed on Apr. 26, 2019, the entire contents of which are incorporated herein by reference.

FIELD

The embodiments discussed herein are related to an information processing apparatus and a distributed processing system.

BACKGROUND

A distributed processing system has been proposed where pieces of dynamic information of people and objects which are distributed and accumulated in a plurality of edge servers are processed in accordance with a request from a user and provided to the user. The aforementioned system is used for a taxi demand prediction service, a service for searching for a taxi or allocating a taxi in real time, or the like.

Related techniques are disclosed in, for example, International Publication Pamphlet No. WO 2015/075962.

SUMMARY

According to an aspect of the embodiments, an information processing apparatus includes: a memory; and a processor coupled to the memory and the processor configured to: identify first data based on an access history of accessing data, the first data being a candidate of data to be temporarily stored in the memory; obtain first load information from other apparatuses at a first time interval; identify second data based on the first load information and second load information of the information processing apparatus, the second data being temporarily stored in the memory and being a candidate of data to be deleted from the memory; obtain third load information from a first apparatus that holds the first data and one or more second apparatuses that hold respective pieces of the second data at a second time interval shorter than the first time interval; and determine, when the first data is accessed, whether the first data is to be temporarily stored in the memory and which piece of the second data is to be deleted when temporarily storing the first data in the memory, based on the third load information and the second load information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11A is a drawing illustrating the load of each edge server corresponding to FIG. 10A, and FIG. 11B is a drawing illustrating the load of each edge server corresponding to FIG. 10B;

FIG. 12A is a drawing illustrating a calculation method for a processing throughput corresponding to FIG. 10A, and FIG. 12B is a drawing illustrating the calculation method for the processing throughput corresponding to FIG. 10B;

FIG. 13B is a drawing illustrating the load of each edge server corresponding to FIG. 13A;

FIG. 14 is a drawing illustrating a calculation method for the processing throughput corresponding to FIG. 13A;

FIG. 16A is a drawing illustrating the load of each edge server corresponding to FIG. 15A, and FIG. 16B is a drawing illustrating the load of each edge server corresponding to FIG. 15B;

FIG. 17A is a drawing illustrating the calculation method for the processing throughput corresponding to FIG. 15A, and FIG. 17B is a drawing illustrating the calculation method for the processing throughput corresponding to FIG. 15B;

FIG. 18B is a drawing illustrating the load of each edge server corresponding to FIG. 18A;

FIG. 19 is a drawing illustrating the calculation method for the processing throughput corresponding to FIG. 18A;

FIG. 20 is a drawing illustrating the calculation method for the processing throughputs of data A and B associated with the cache change in edge servers other than an edge server i;

FIG. 23 is a drawing illustrating a data structure of a data location information table;

FIG. 25A is a drawing illustrating a resource information temporary storage table, FIG. 25B is a drawing illustrating a data access statistic table, and FIG. 25C is a drawing illustrating a cache table;

FIG. 27A is a drawing illustrating a structure of a message (m1) of an app processing request, and FIG. 27B is a drawing illustrating a structure of a message (m2) of an app processing response;

FIG. 28A is a drawing illustrating a structure of a message m1') of the app processing request, and FIG. 28B is a drawing illustrating a structure of a message (m2') of the app processing response;

FIG. 29A is a drawing illustrating a structure of a message (m3) of a data obtaining request, and FIG. 29B is a drawing illustrating a structure of a message (m4) of a data obtaining response;

FIG. 30A is a drawing illustrating a structure of a message (m5) of a data/cache location request, FIG. 30B is a drawing illustrating a structure of a message (m6) of a data/cache location response, and FIG. 30C is a drawing illustrating a structure of a message (m7) of a resource information exchange;

FIG. 37 is a drawing illustrating a data structure of a data location information management table according to the second embodiment.

DESCRIPTION OF EMBODIMENTS

In the above-described distributed processing system, when the processing is executed by any one of the edge servers, the edge server that is to increase a processing throughput of the entire system changes in accordance with a location of data used for the processing or load information of each edge server. Therefore, to increase the processing throughput of the entire system, data to be cached is to be determined or the edge server that executes the processing is to be determined based on a situation where a data processing request is issued. To promptly perform the above-described determination, the load information of each edge server is preferably regularly collected, but the traffic amount in a network further increases as a collection frequency is higher.

First Embodiment

A distributed processing system according to a first embodiment will be described in detail below with reference to FIGS. 1 to 35.

Figure 1:
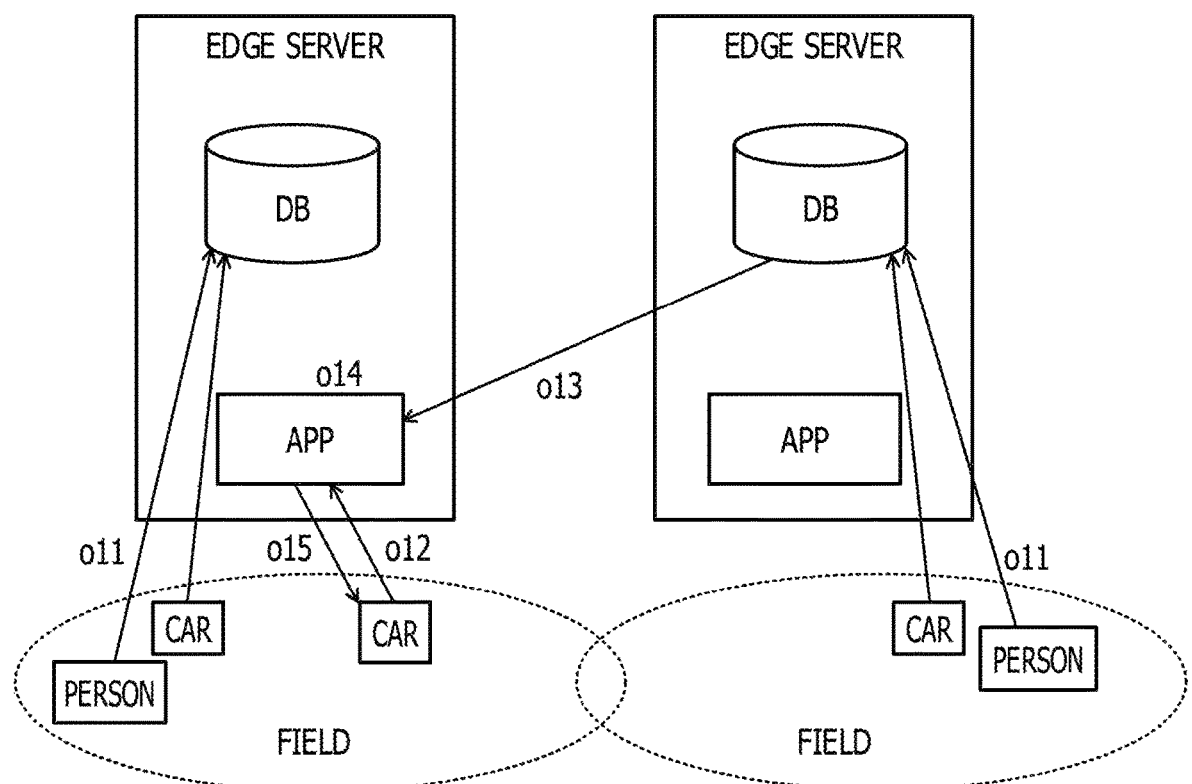
FIG. 1 is a schematic diagram of a distributed processing system according to a first embodiment.

FIG. 1 illustrates an outline of the distributed processing system according to the present first embodiment. The distributed processing system according to the present first embodiment includes a plurality of edge servers, processes pieces of dynamic information related to people and objects (for example, cars) which are distributed and accumulated in databases (DBs) of the respective edge servers in accordance with a request of a user (for example, a user getting in a car), and provides a processing result. For example, the distributed processing system is used for a taxi demand prediction service, a service for searching for a taxi or allocating a taxi in real time, or the like.

FIG. 1 illustrates exemplary steps (o11-o115) performed by the distributed processing system. As illustrated in FIG. 1, in each of the edge servers, the dynamic information of people and objects existing in a field is collected and appropriately processed to be stored in the database over the edge server (o11). For example, when a person (also referred to as a user) getting in a car requests the edge server for the dynamic information of surrounding people and objects or a processing result obtained from the information (o12), an application ("app") of the edge server obtains data to be used from the database in its own apparatus or database of the surrounding edge server (o13). The app processes the dynamic information related to the people and objects (o14), and provides the processing result to the user (o15).

In the distributed processing system according to the present first embodiment, when a task execution request is issued from the user to any one of the edge servers, the processing is to be executed in the edge server that has the highest response performance.

Figure 2:
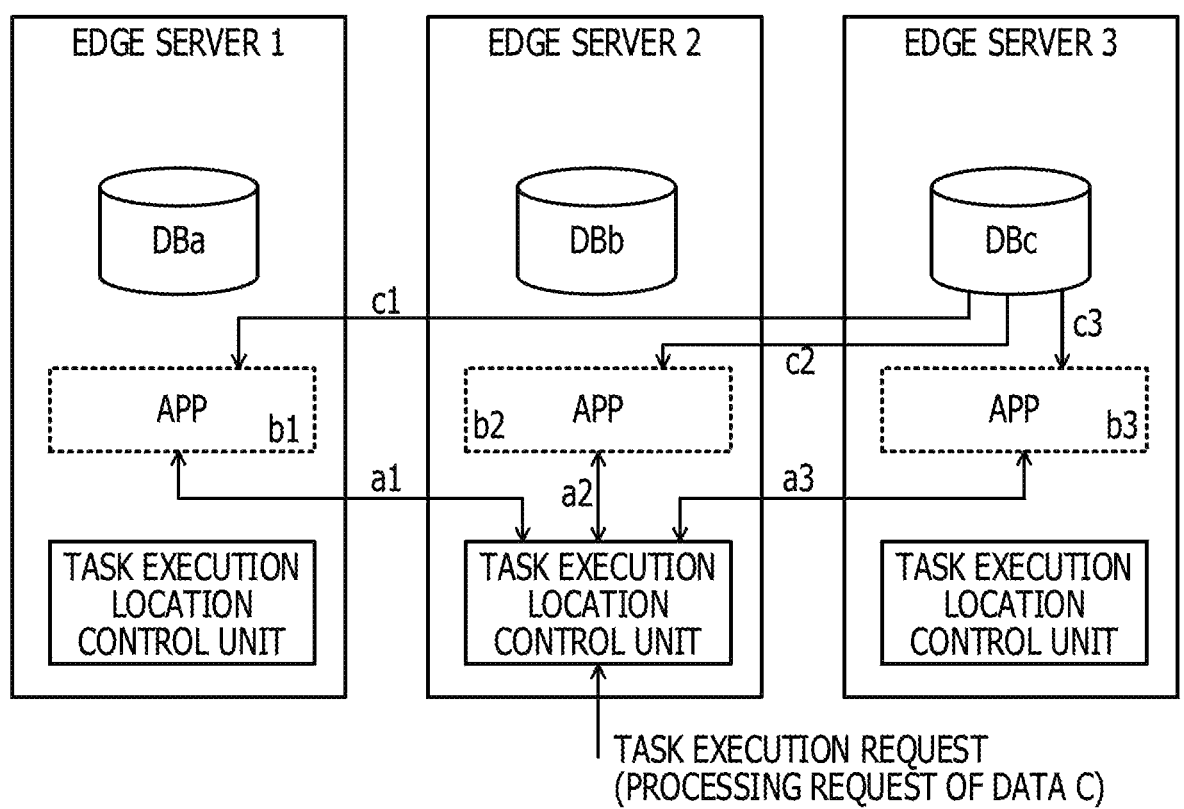
FIG. 2 is a drawing for describing a calculation method for a time until task execution in an edge server is completed.

FIG. 2 is a drawing for describing a calculation method for a time since the task execution request is issued in the edge server until the task execution is completed.

As illustrated in FIG. 2, a processing request (task execution request) of data C stored in a database (DBc) of an edge server 3 is issued to a certain edge server (in FIG. 2, an edge server 2) from the user. In FIG. 2, a1 to a3 mean times used for a task execution location control unit to perform the task execution request to the app and to transfer a response from the app (task execution request and response transfer time). Further, b2 to b3 mean times used for the app to execute the task and times to wait for the execution (task execution and execution waiting time), and c2 to c3 mean times used for the data C to be transferred to the app (data transfer time).

In this case, the time until task completion is represented by the following Expression (1).

$$\text{Time until task completion} = \text{(task execution request and response transfer time} + \text{task execution and execution waiting time} + \text{data transfer time)} \quad (1)$$

Therefore, when the task execution request is accepted, the task execution location control unit of the edge server 2 calculates the times until the task completion (a1+b1+c1, a2+b2+c2, and a3+b3+c3) based on the data locations and load information shared between the edges. The task execution location control unit selects the app with which the calculated time becomes the lowest as a task execution location.

FIGS. 3A to 5C are drawings for describing that the app that is to execute the task differs in accordance with loads of the edge servers, a data source amount, processing result data, and processing request data.

Figure 3A:
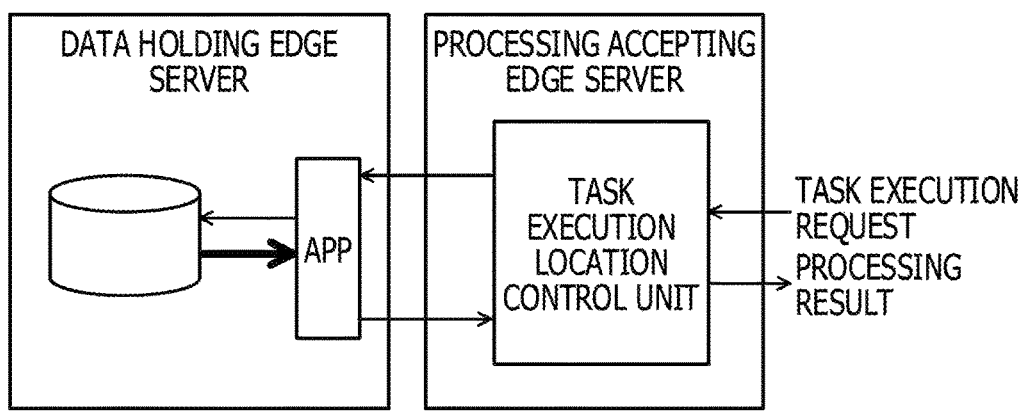
FIGS. 3A to 3C are drawings for describing that an app that is to execute a task differs in accordance with loads of edge servers, a data source amount, processing result data, and processing request data.
Figure 3B:
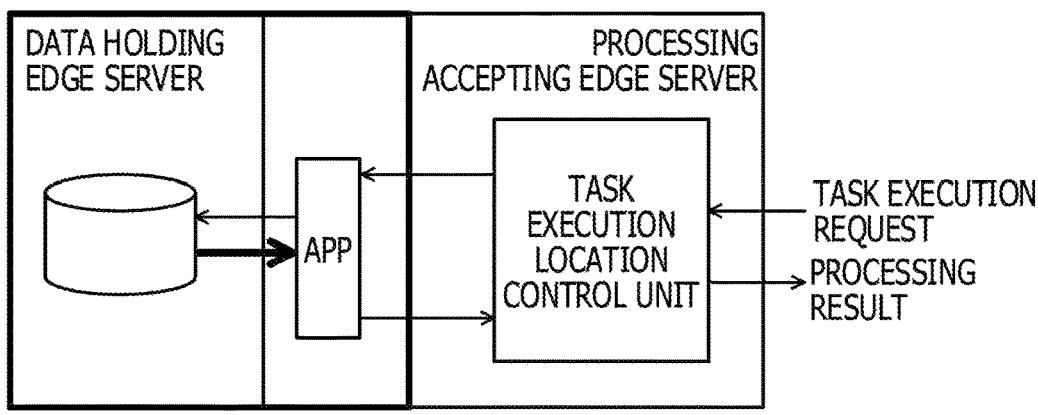
Figure 3C:
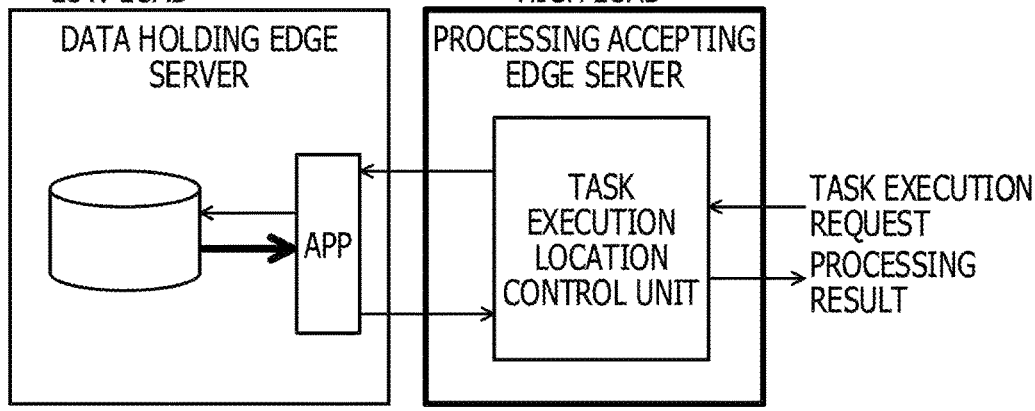

FIGS. 3A to 3C illustrate a case where the data source amount is high, for example, a case where the data amount obtained from the database is high when the app executes the task. In a case where the data source amount is high and edge loads are even, as illustrated in FIG. 3A, the time until the task completion is shortened when the app of the data holding edge server executes the task. As illustrated in FIG. 3C, also in a case where the processing accepting edge server has a higher load, when the app of the data holding edge server executes the task, the time until the task completion is shortened. As illustrated in FIG. 3B, in a case where the data holding edge server has a higher load, the times until the task completion when the apps of the respective edge servers execute the tasks are calculated based on the above Expression (1), and the app with which the time becomes the shorter is to execute the task.

Figure 4A:
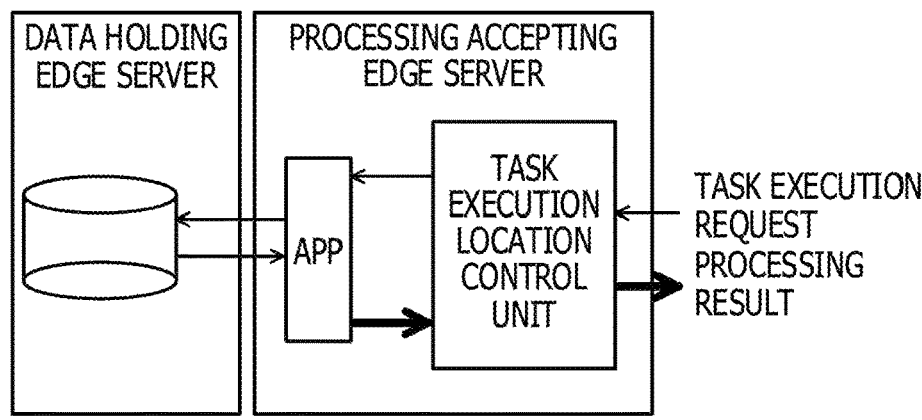
FIGS. 4A to 4C are drawings for describing that the app that is to execute the task differs in accordance with the loads of the edge servers, the data source amount, the processing result data, and the processing request data.
Figure 4B:
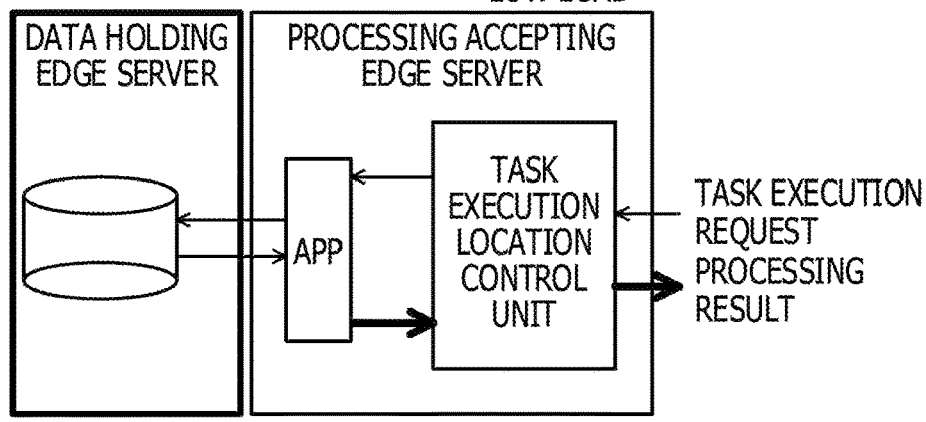
Figure 4C:
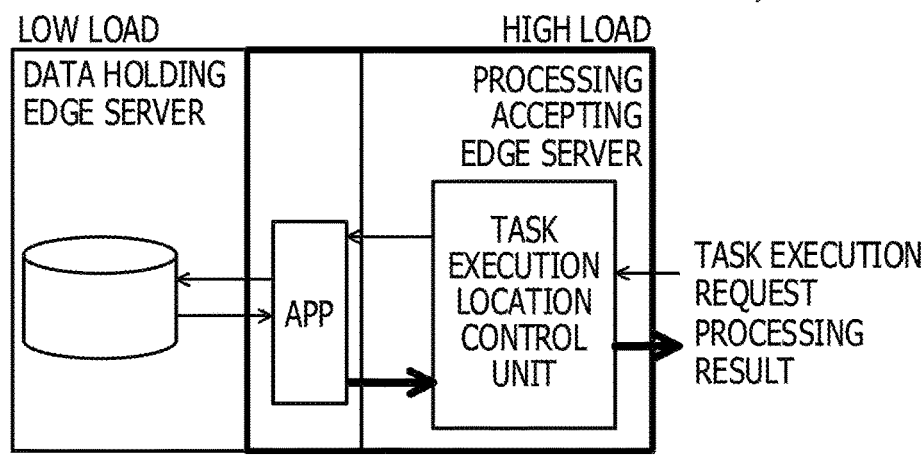

FIGS. 4A to 4C illustrate a case where the processing result data amount in the app is high. When the processing result data amount in the app is high, as illustrated in FIG. 4A, in a case where the edge loads are even, when the app of the processing accepting edge server executes the task, the time until the task completion is shortened. As illustrated in FIG. 4B, also in a case where the data holding edge server has a higher load, when the app of the processing accepting edge server executes the task, the time until the task completion is shortened. As illustrated in FIG. 4C, in a case where the processing accepting edge server has a higher load, the times until the task completion when the apps of the respective edge servers execute the tasks are calculated based on the above Expression (1), and the app with which the time becomes the shorter is to execute the task.

Figure 5A:
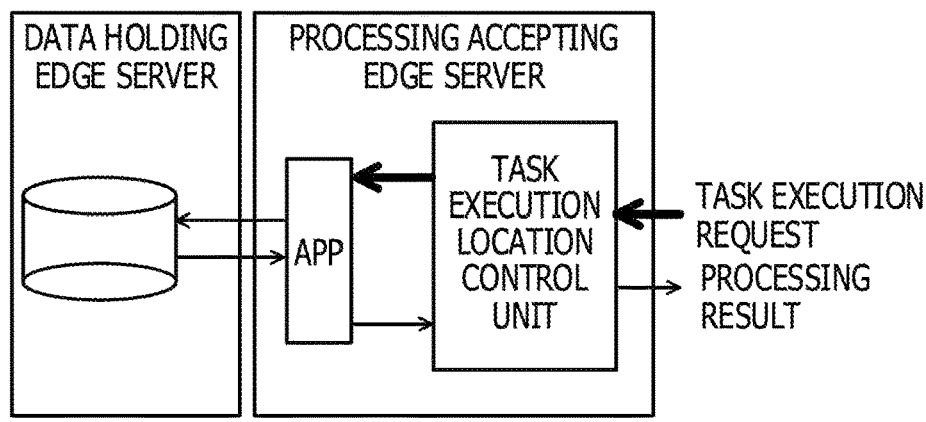
FIGS. 5A to 5C are drawings for describing that the app that is to execute the task differs in accordance with the loads of the edge servers, the data source amount, the processing result data, and the processing request data.
Figure 5B:
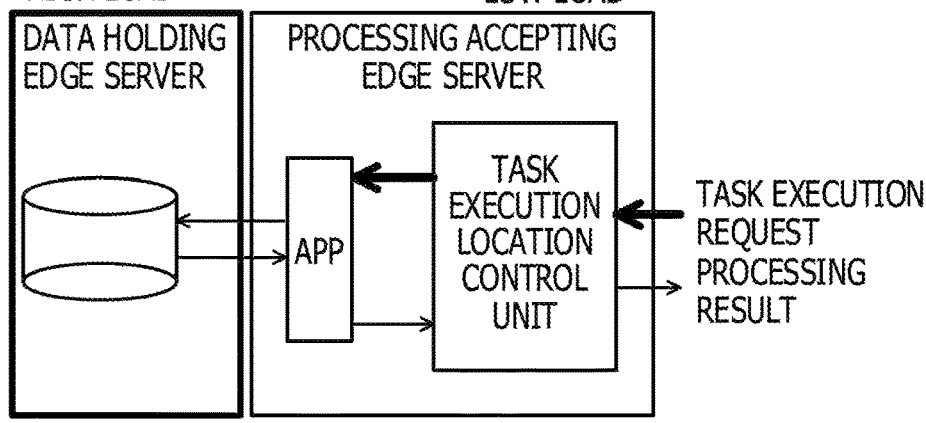
Figure 5C:
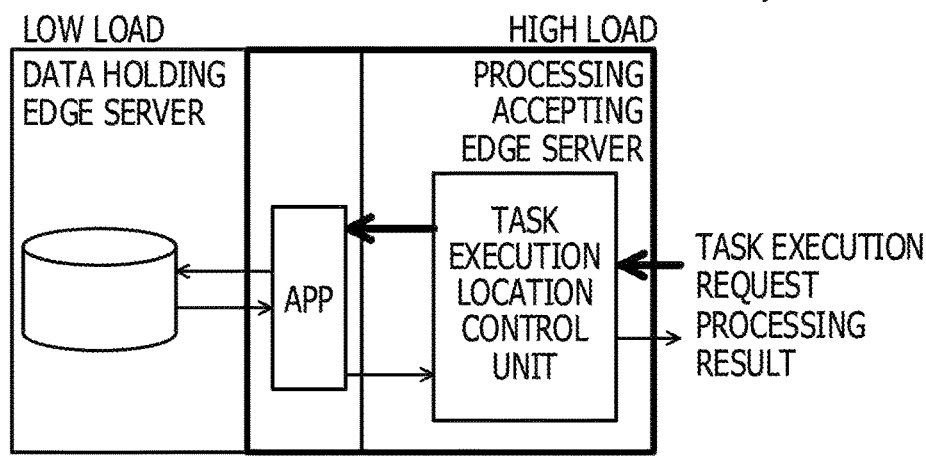

FIGS. 5A to 5C illustrate a case where the processing request data amount is high. When the processing request data amount is high, as illustrated in FIG. 5A, in a case where the edge loads are even, when the app of the processing accepting edge server executes the task, the time until the task completion is shortened. As illustrated in FIG. 5B, also in a case where the data holding edge server has a higher load, when the app of the processing accepting edge server executes the task, the time until the task completion is shortened. As illustrated in FIG. 5C, in a case where the processing accepting edge server has a higher load, the times until the task completion when the apps of the respective edge servers execute the task are calculated based on the above Expression (1), and the app with which the time becomes the shorter is to execute the task.

Figure 6A:
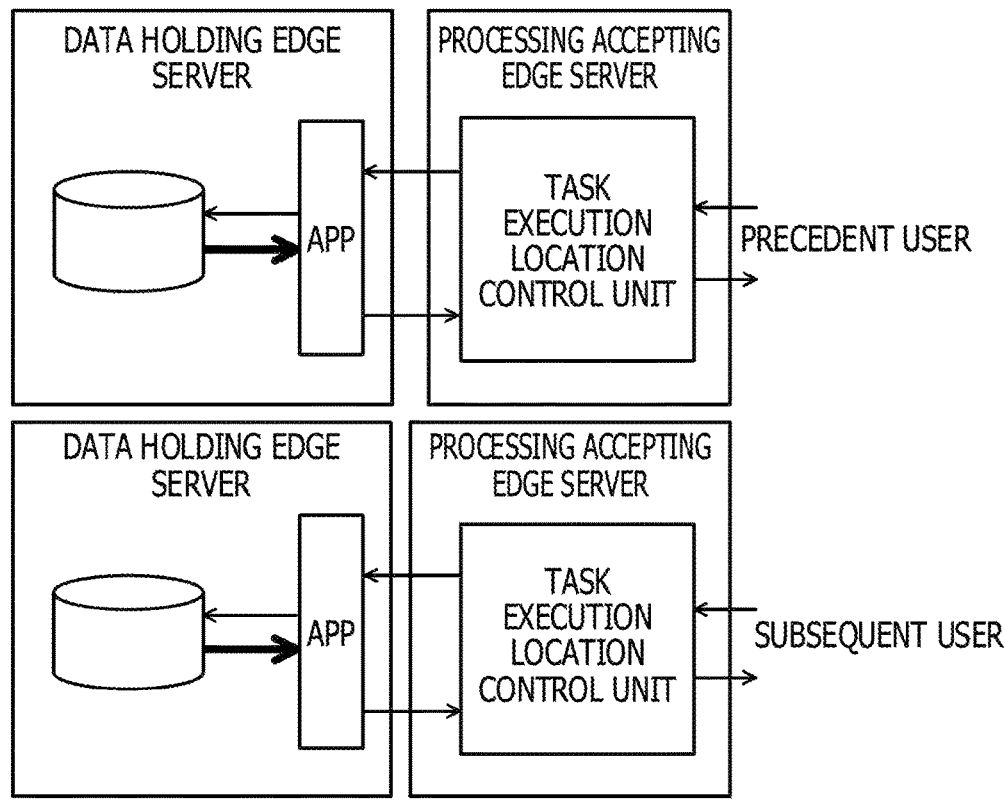
FIG. 6A is a drawing illustrating a case where cache is not generated in a processing accepting edge server.

According to the present first embodiment, cache in the processing accepting edge server is further taken into account to select the app that is to execute the task. FIG. 6A schematically illustrates a case where cache is not generated in the processing accepting edge server, and FIG. 68 schematically illustrates a case where cache is generated in the processing accepting edge server.

As illustrated in an upper part in FIG. 6A when a task execution request is issued from a precedent user, the app of the data holding edge server is set to execute the task processing. Thereafter, as illustrated in a lower part in FIG. 6A, when the same task execution request is issued from a subsequent user too, the app of the data holding edge server is similarly set to execute the task processing. A throughput in this case may be represented by the following Expression (2) when a processing time in the app of the data holding edge server is set as Tb1 and a task execution request and response time between the processing accepting edge server and the data holding edge server is set as Ta21.

$$\text{Throughput} 1/(Tb1+Ta21)[rps] \qquad (2)$$

Figure 6B:
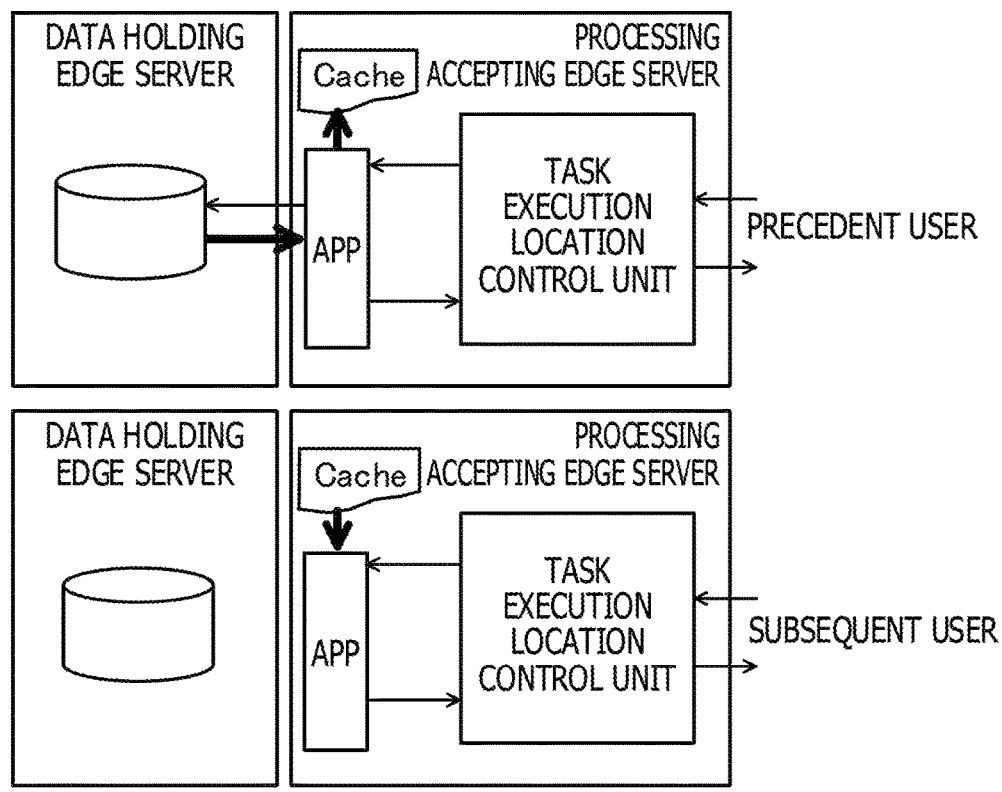
FIG. 6B is a drawing illustrating a case where cache is generated in the processing accepting edge server.

As illustrated in an upper part in FIG. 6B, when the task execution request is issued from the precedent user, the app of the processing accepting edge server is set to execute the task processing and cache the used data. Thereafter, as illustrated in a lower part in FIG. 6B, when the same task execution request is issued from the subsequent user too, the app of the processing accepting edge server is set to execute the task processing using the cache. A throughput in this case may be represented by the following Expression (3) when a processing time in the app of the processing accepting edge server is set as Tb2, and a data transfer time when the task processing of the precedent user is performed is set as Tc21.

$$\text{Throughput} n/(\text{total of Tb2 in all task processing}+ Tc21)[rps] \qquad (3)$$

Therefore, whether or not the cache is to be generated may be determined by comparing the throughputs calculated using the above Expressions (2) and (3) and selecting the configuration with which the throughput becomes the higher. In the present example, the data actually used for the task execution is cached without using active cache.

Figure 7:
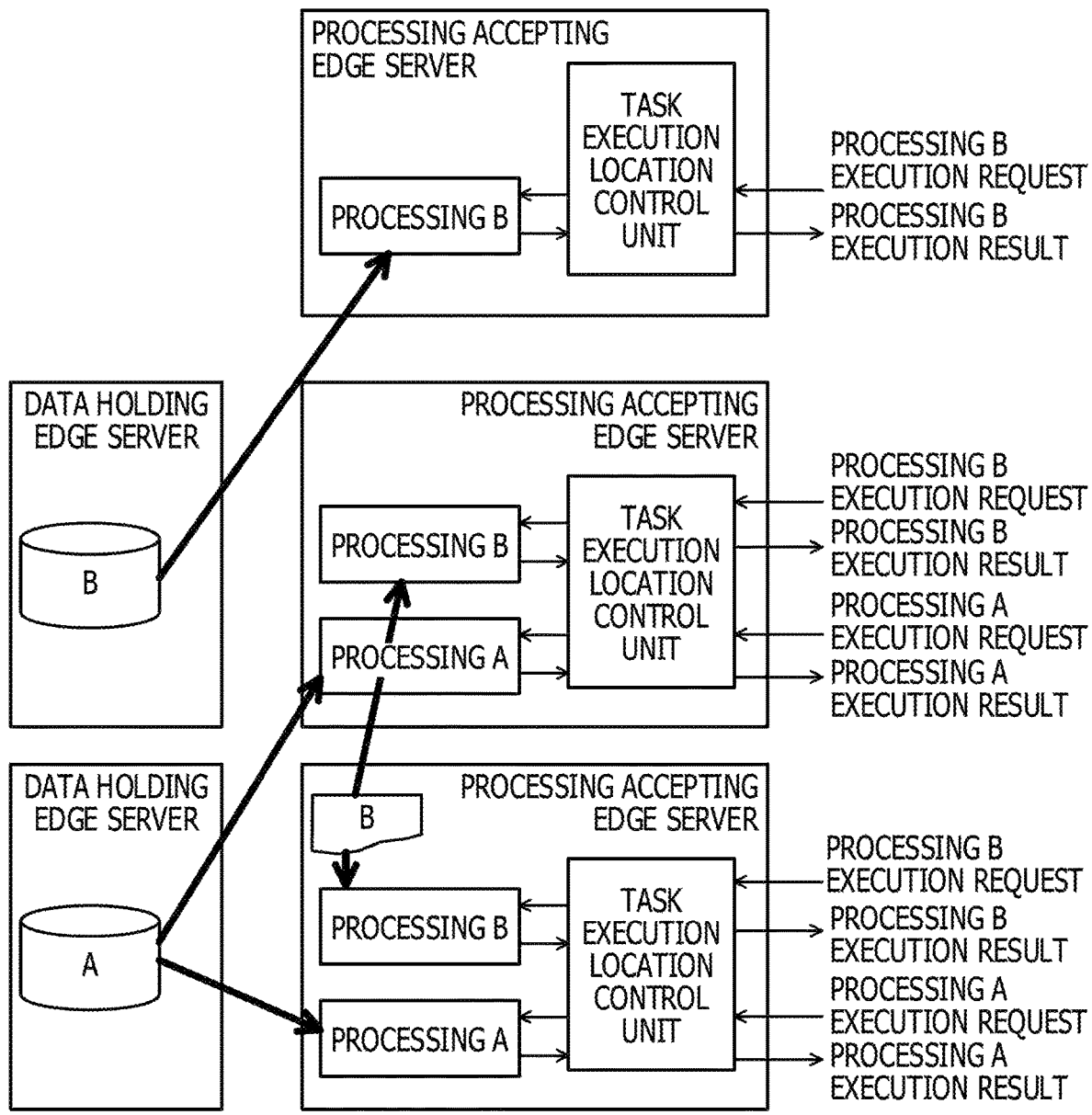
FIG. 7 is a drawing for describing an influence due to cache change.

FIG. 7 illustrates an example where an execution request for processing B (processing using data B) is issued to one processing accepting edge server, and an execution request for processing A (processing using data A) and the processing B are issued to two processing accepting edge servers among three processing accepting edge servers. In FIG. 7, in the edge server that has accepted the task execution request, each processing is set to be executed, the first processing accepting edge server from the top in FIG. 7 obtains data from the data holding edge server that holds the data B. The second and third processing accepting edge servers from the top in FIG. 7 obtain the data B from the cache of the third processing accepting edge server, and obtain the data A from the data holding edge server that holds the data A.

Figure 8:
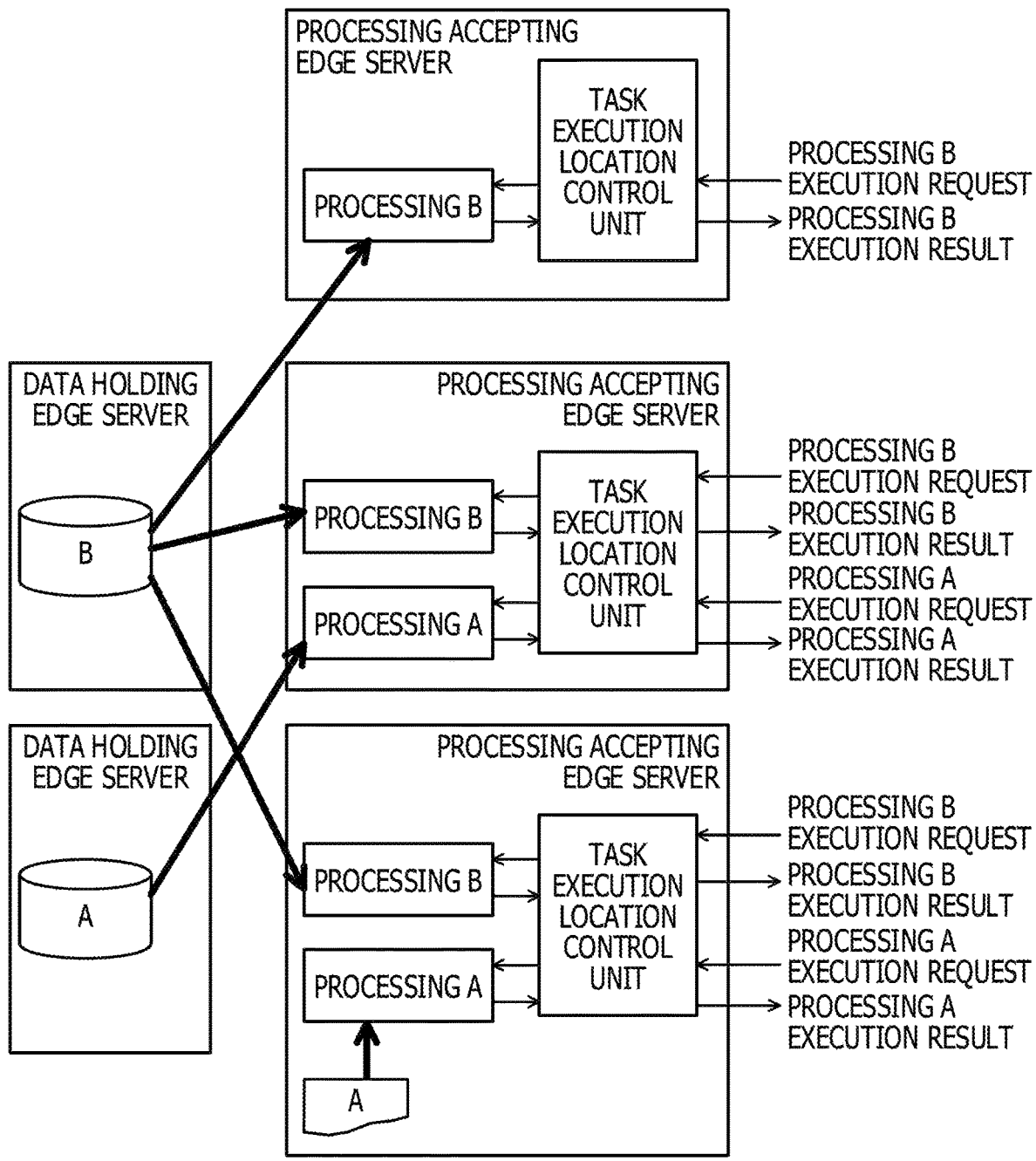
FIG. 8 is a drawing for describing the influence due to the cache change.

In this case, as illustrated in FIG. 8, it is assumed that the third processing accepting edge server from the top caches the data A instead of the data B while the load of the edge server is set as a reference (cache change). In this case, as illustrated in FIG. 8, the access load in the data holding edge server that holds the data B increases, and accesses to the data B become a bottleneck, and there is a fear that a throughput of the entire system may decrease.

Therefore, according to the present first embodiment, out of a case where the cache is changed and a case where the cache is not changed, the case where the total throughput is higher is selected by taking into account not only the processing accepting edge server that changes the cache but also the data access of the entire system due to the cache change. In other words, when the execution request for the processing A is issued to the third processing accepting edge server from the top in the state in FIG. 7, whether the data B is cached out to cache in the data A, or the cache is maintained as illustrated in FIG. 7 is determined based on the total throughput.

When the above-described determination is performed, the processing accepting edge server uses resource information including information such as the loads of the respective processing accepting edge servers and data holding edge servers.

(Resource Information)

Figure 9:
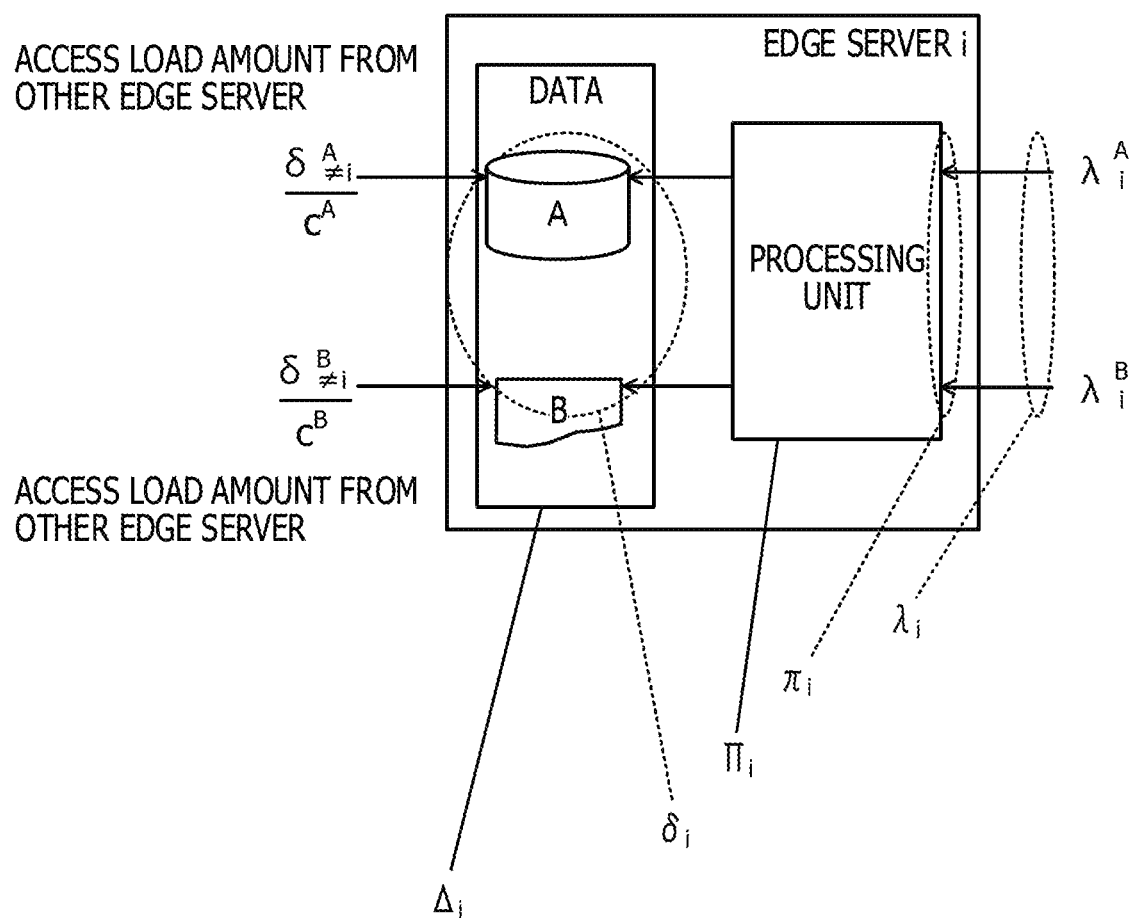
FIG. 9 is a drawing for describing resource information of the edge server.

The resource information used at the time the above-described determination will be described with reference to FIG. 9. The resource information of the edge server i illustrated in FIG. 9 includes $\pi_i$, $\delta_i$, $\Pi_i$ and $\Delta_i$. $\pi_i$ denotes a data processing load total amount of the edge server i. $\delta_i$ denotes a data access load total amount of the edge server i. $\Pi_i$ denotes a data processing capacity of the edge server i. $\Delta_i$ denotes a data access capacity of the edge server i. Any of those is represented by the number of requests per unit time, used CPU clocks per unit time, or the like. $\pi_i$ and $\delta_i$ are regularly collected, but $\Pi_i$ and $\Delta_i$ are collected only at the time of activation or setting change. $\lambda^A_i$ and $\lambda^B_i$ illustrated in FIG. 9 mean access amounts regarding the processing A and the processing B with respect to the edge server i. $\lambda_i$ denotes an access total amount to the edge server i and may be represented by the following Expression (4).

$$\lambda_i = \sum_M \lambda_i^M \quad (4)$$

$\lambda_i^M$ may be represented as $\lambda_i^M \rightarrow \pi_i^M$, $\delta_i^M$ using an access load $\pi_i^M$ to data M in the edge server i and a processing load $\delta_i^M$ of the data M in the edge server i.

The data processing load total amount n of the edge server i and the data access load total amount $\delta_i$ of the edge server i are represented by the following Expressions (5) and (6).

$$\pi_i = \sum_M \pi_i^M \quad (5)$$

$$\delta_i = \sum_M \delta_i^M \quad (6)$$

Original data and cache data are distributed and arranged in a plurality of edge servers, and a total number thereof is represented by c. Since other edge servers access the respective original data or cache data, the load becomes $\delta/c$ in average. When cache data B exists in the edge server i as illustrated in FIG. 9, the access loads to the cache data B from the edge servers other than the edge server i is represented by $\delta^B_{\neq i}/c^B \cdot c^B$ denotes the total number of data B, and $\delta^B_{\neq i}$ denotes a total of access loads to the data B from the edge servers other than the edge server i. Similarly, when the original data A exists in the edge server i in FIG. 9, the access loads to the data A from the edge servers other than the edge server i is represented by $\delta^A_{\neq i}/C^A \cdot c^A$ denotes the total number of data A, and $\delta^A_{\neq i}$ denotes a total of access loads to the data A from the edge servers other than the edge server i. The data access load total amount $\delta_i$ of edge server i includes the access loads from the above-described other edge servers.

(Supposed Load upon Cache in and out of Data)

Hereinafter, a supposed load upon cache in and out of data will be described.

(1) Pattern 1

Figure 10A:
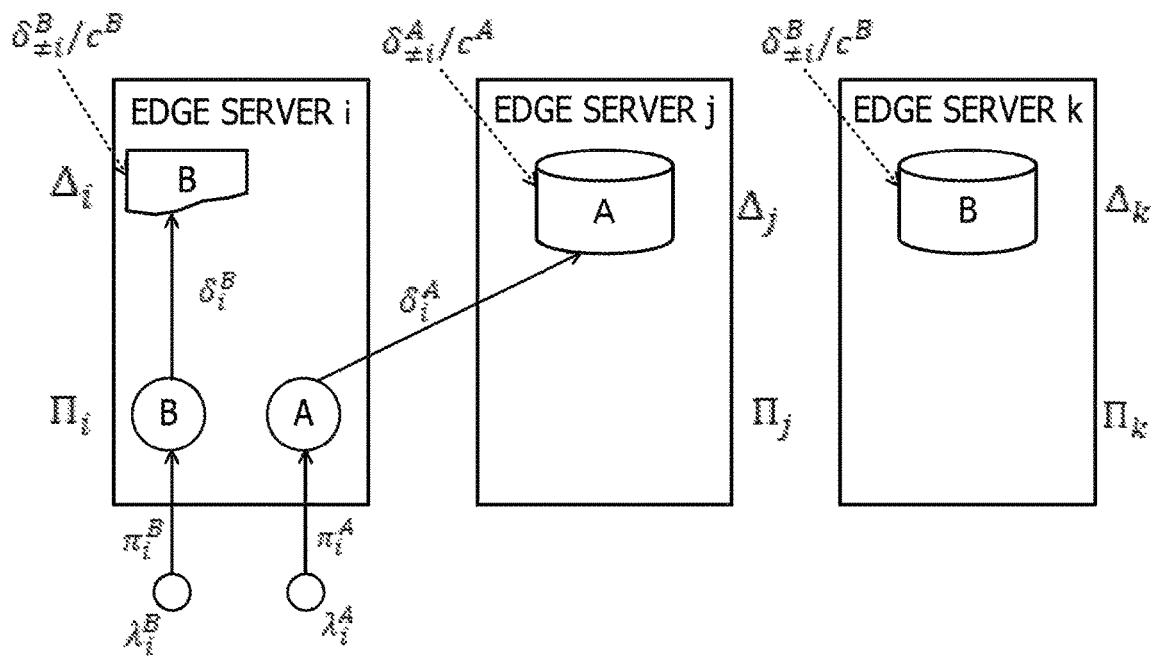
FIGS. 10A and 10B are drawings for describing the cache change (Pattern 1)

As a premise, as illustrated in FIG. 10A, the edge server i holds the cache data B, an edge server j holds the original data A, and an edge server k holds the original data B. The resource information of each of the edge servers i, j, and k when the cache is maintained is as illustrated in FIG. 10A.

In Pattern 1, either when the cache is maintained or when the cache is changed, the edge server i is set to execute the processing of the data A and B. When the cache is changed, as illustrated in FIG. 10B, the data B is cached out to cache in the data A.

Figure 10B:
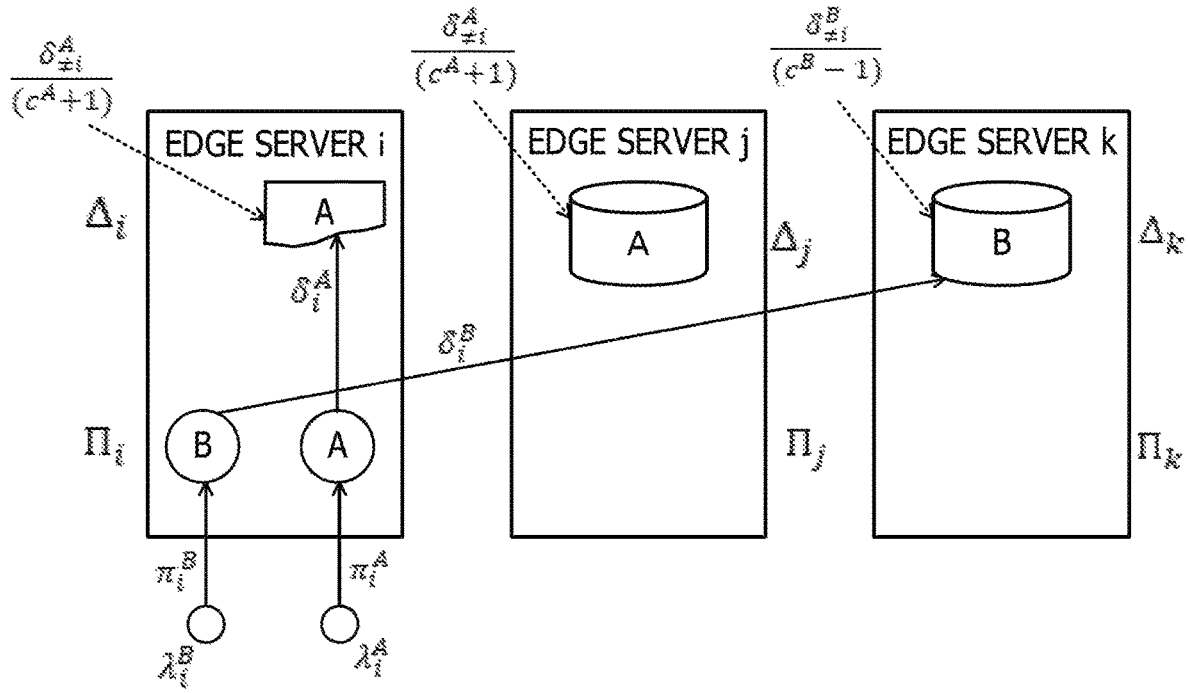

The resource information of each of the edge servers i, j, and k when this cache change is performed is as illustrated in FIG. 10B. When the cache data is changed as illustrated in FIG. 10B, accesses from the other edge servers also increase or decrease in accordance with the change.

FIG. 11A illustrates data processing load total amounts of the respective edge servers i, j, and k and data access load total amounts when the cache is maintained as illustrated in FIG. 10A, FIG. 11B illustrates the data processing load total amounts of the respective edge servers i, j, and k and the data access load total amounts when the cache is changed as illustrated in FIG. 10B. As illustrated in FIG. 11B, the data processing load total amounts do not change from FIG. 11A, but the data access load total amounts change from FIG. 11A in the respective edge servers. Since the cache data is changed as illustrated in FIG. 11B, for example, when the cache data increases, the loads as the entire system are distributed, and therefore the access loads to the respective data decrease.

FIG. 12A illustrates a calculation method for the processing throughput of the data processing in the edge server i in the case of FIG. 10A. Since the processing throughput $TP^A_i$ of the data A in the edge server i is rate-controlled by the lower one of a data access throughput $TPA^{A, \delta, i}$ and a data processing throughput $TPA^{A, \pi, i}$ the lower one of values of $TPA^{A, \delta, i}$ and $TPA^{A, \pi, i}$ is set.

Regarding the data access throughput, as illustrated in FIG. 12A, the data access load generated from the processing requests is compared with the data access capacity of the edge server that executes the processing, and when the load is equal to or lower than the capacity, the throughput for the load is set. Similarly, regarding the data processing throughput, the data processing load generated from the processing requests is compared with the data processing capacity of the edge server that executes the processing, and when the load is equal to or lower than the capacity, the throughput for the load is set. When the data access load and the data processing load generated from the processing requests exceed the respective capacities, a value obtained by multiplying the load by a coefficient such that the load falls into the capacity as a whole is set as the throughput.

FIG. 12B illustrates a calculation method for processing throughputs $TP'^A_i$ and $TP'^B_i$ of the data processing in the edge server i in the case of FIG. 10B. Regarding FIG. 12B too, a similar calculation method to that of FIG. 12A is adopted.

(2) Pattern 2

Figure 13A:
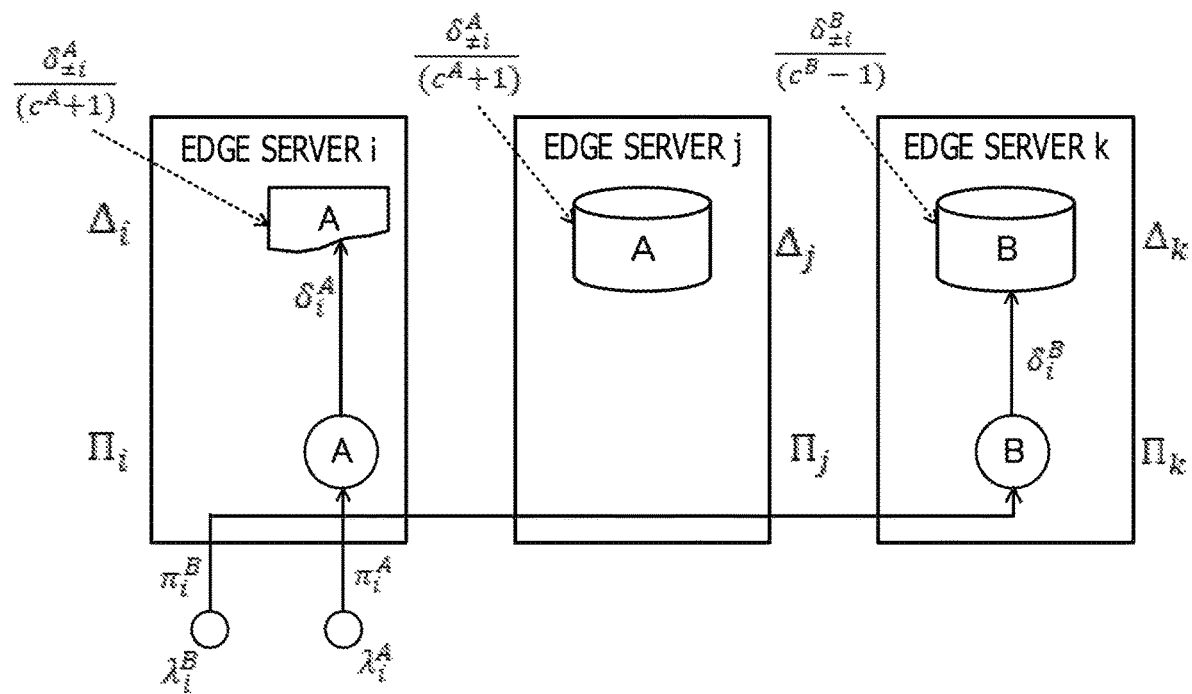
FIG. 13A is a drawing describing the cache change (Pattern 2)

In Pattern 2, the same as Pattern 1 applies when the cache is maintained, but when the cache is changed, the edge server i executes the processing of the data A, and the edge server k executes the processing of the data B as illustrated in FIG. 13A. The resource information of each of the edge servers i, j, and k in this Pattern 2 is as illustrated in FIG. 13A.

FIG. 13B illustrates the data processing load total amounts and the data access load total amounts of the respective edge servers i, j, and k in Pattern 2 of FIG. 13A. As illustrated in FIG. 13B, the data access processing total amounts do not change from FIG. 11A, but the data access load total amounts change from FIG. 11A in the respective edge servers. Since the cache data is changed as illustrated in FIG. 13A, for example, when the cache data increases, the loads as the entire system are distributed, and therefore the access loads to the respective data decrease.

FIG. 14 illustrates a calculation method for the processing throughput of the data processing in the edge server i in Pattern 2 of FIG. 13A. In this Pattern 2 too, similarly as in Pattern 1, the processing throughputs $TP'^A_i$ and $TP'^B_i$ of the data processing in the edge server i are calculated.

(3) Pattern 3

Figure 15A:
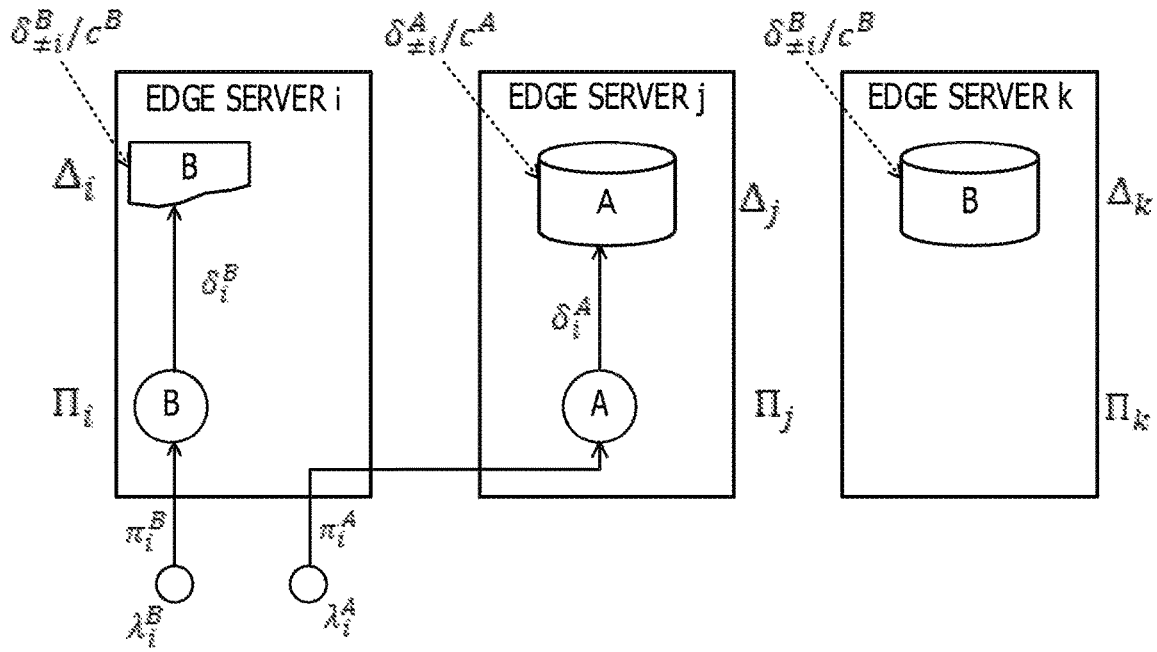
FIGS. 15A and 15B are drawings for describing the cache change (Pattern 3)
Figure 15B:
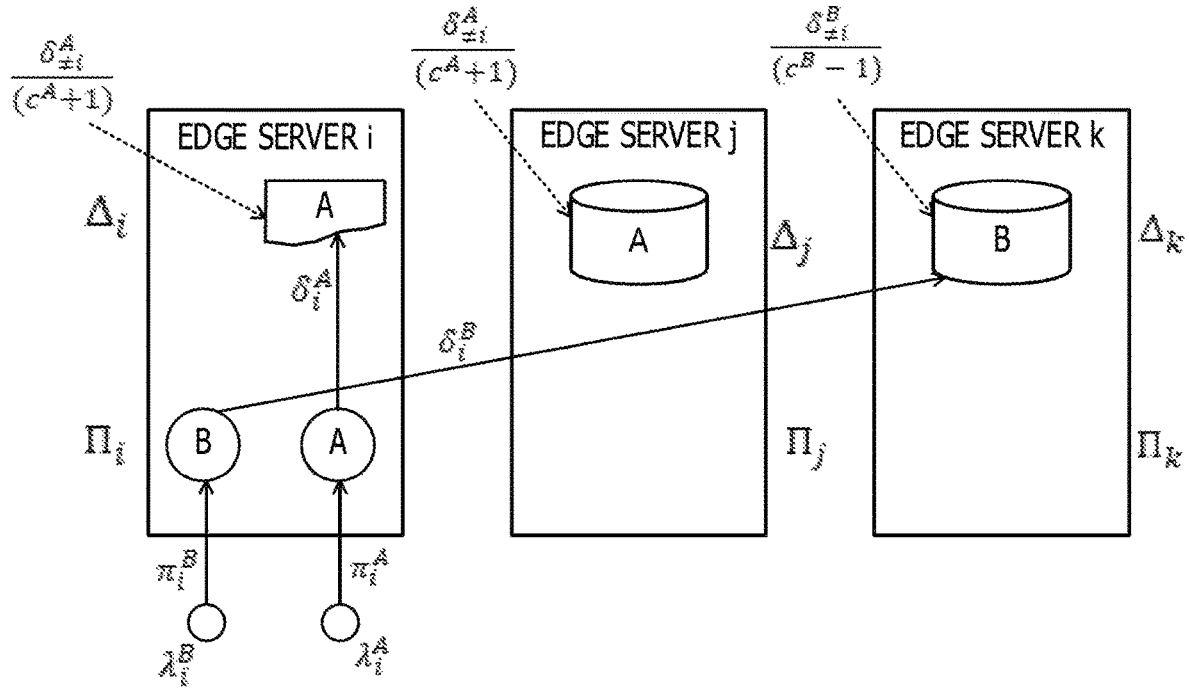

In Pattern 3, as illustrated in FIG. 15A, when the cache is maintained, the edge server i executes the processing of the data B, and the edge server j executes the processing of the data A. When the cache is changed, as illustrated in FIG. 15B, the edge server i executes the processing of the data A and B.

FIG. 16A illustrates the data processing load total amounts of the respective edge servers i, j, and k and the data access load total amounts when the cache is maintained as illustrated in FIG. 15A. FIG. 16B illustrates the data processing load total amounts and the data access load total amounts of the respective edge servers i, j, and k in Pattern 3 of FIG. 15B. As illustrated in FIG. 16B, regarding the data processing load total amounts, the data processing load total amounts of the edge servers i and j change from FIG. 16A, and regarding the data access load total amounts, the data access load total amounts of the respective edge servers change from FIG. 16A.

FIG. 17A illustrates the calculation method for the processing throughput of the data processing in the edge server i in the case of FIG. 15A. Since the processing throughput $TP^A_i$ of the data A in the edge server i is rate-controlled by the lower one of the data access throughput $TPA^{A, \delta, i}$ and the data processing throughput $TPA^{A, \pi, i}$, the lower one of the values of $TPA^{A, \delta, i}$ and $TPA^{A, \pi, i}$ is set.

Regarding the data access throughput, as illustrated in FIG. 17A, the data access load generated from the processing requests is compared with the data access capacity of the edge server that executes the processing, and when the load is equal to or lower than the capacity, the throughput for the load is set. Similarly, regarding the data processing throughput, the data processing load generated from the processing requests is compared with the data processing capacity of the edge server that executes the processing, and when the load is equal to or lower than the capacity, the throughput for the load is set. When the data access load and the data processing load generated from the processing requests exceed the capacities, the value obtained by multiplying the load by the coefficient such that the load falls into the capacity as a whole is set as the throughput.

FIG. 17B illustrates the calculation method for the processing throughputs $TP^A_i$ and $TP^B_i$ of the data processing in the edge server i in the case of FIG. 15B. Regarding FIG. 17B too, a similar calculation method to that of FIG. 17A is adopted.

(4) Pattern 4

Figure 18A:
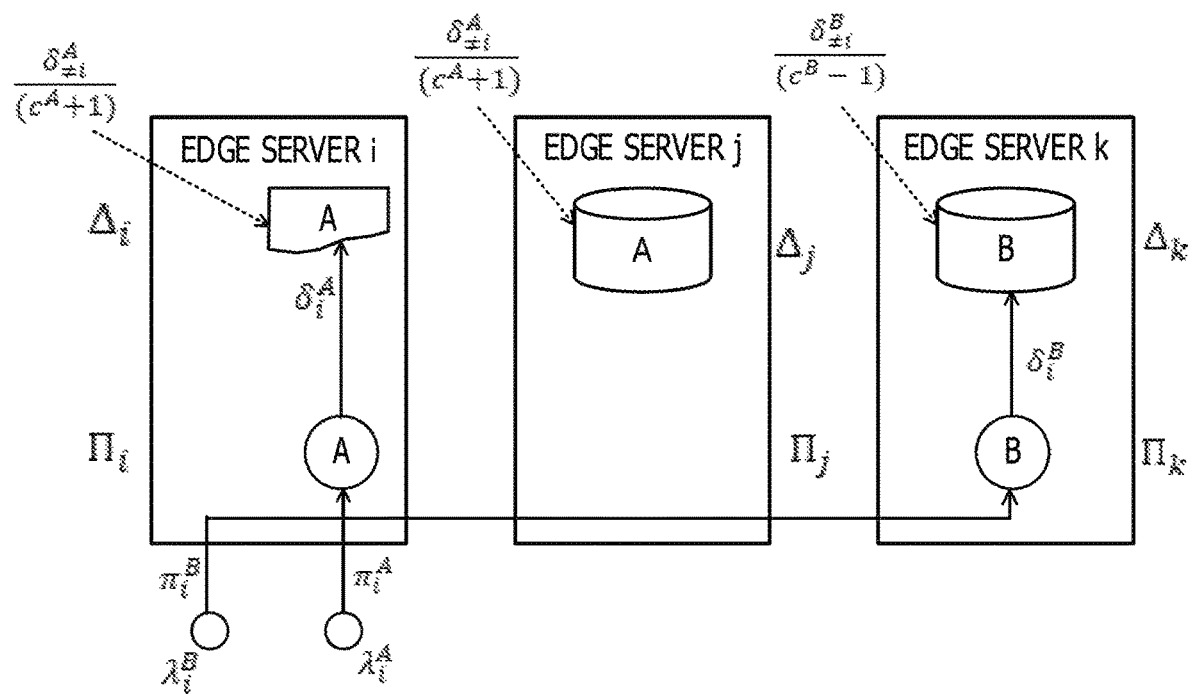
FIG. 18A is a drawing describing the cache change (Pattern 4)

In Pattern 4, the same as Pattern 3 (FIG. 15A) applies when the cache is maintained, but when the cache is changed, the edge server i executes the processing of the data A, and the edge server k executes the processing of the data B as illustrated in FIG. 18A. The resource information of each of the edge servers i, j, and k in this Pattern 4 is as illustrated in FIG. 18A.

FIG. 18B illustrates the data processing load total amounts and the data access load total amounts of the respective edge servers i, j, and k in Pattern 4 of FIG. 18A. As illustrated in FIG. 18B, the data processing load total amounts and the data access load total amounts of the respective edge servers change from FIG. 16A.

FIG. 19 illustrates the calculation method for the processing throughput of the data processing in the edge server i in Pattern 4 of FIG. 18A. In this Pattern 4 too, similarly as in Patterns 1 to 3, the processing throughputs $TP^A_i$ and $TP^B_i$ of the data processing in the edge server i are calculated.

(Calculation for Throughputs of Other Edge Servers)

Next, the calculation method for the processing throughputs of data A and B associated with the cache change in edge servers other than the edge server i will be described. The calculation method for the processing throughputs in the edge servers other than the edge server i is common in the above-described Patterns 1 to 4.

FIG. 20 illustrates the processing throughputs $TP^A_{\sim i}$ and $TP^B_{\sim i}$ of the data A and the data B in the edge servers other than the edge server i when the cache is maintained. As illustrated in FIG. 20, the processing throughput of the data A is determined from a magnitude relationship between the data access capacity of the edge server that holds the data A and the processing request amount with respect to the data A. Similarly, the processing throughput of the data B is also determined from a magnitude relationship between the data access capacity of the edge that holds the data B and the processing request amount with respect to the data B.

The processing throughputs $TP'^A_{\sim i}$ and $TP'^B_{\sim i}$ of the data A and the data B in the edge servers other than the edge server i when the cache is changed may also be similarly calculated.

(Cache Change Determination)

When it is determined whether or not the cache change is performed, a total TP of the processing throughputs of the data A and B when the cache is maintained is compared with a total TP' of the processing throughputs of the data A and B when the cache is changed. When the total of the processing throughputs when the cache is changed is higher (TP<TP'), the cache change is performed.

The total TP of the processing throughputs when the cache is maintained and the total TP' of the processing throughputs when the cache is changed may be obtained from the following Expressions (7) and (8).

$$TP = TP^A_i + TP^B_i + TP^A_{\sim i} + TP^B_{\sim i} \quad (7)$$

$$TP' = TP'^A_i + TP'^B_i + TP'^A_{\sim i} + TP'^B_{\sim i} \quad (8)$$

This cache change determination is executed when each edge server accepts the data processing request. Therefore, at the time of the cache change determination, the edge server is to obtain the latest load information of the other edge servers. When each edge server frequently collects the load information from all of the other edge servers, the traffic amount becomes high. To aim at reducing the traffic amount, when a query is made to the other edge servers each time a data processing request is accepted, there is a fear that service response may deteriorate. According to the present embodiment, while the service response is maintained to be high, to reduce the traffic amount, the following configuration is adopted.

Figure 21:
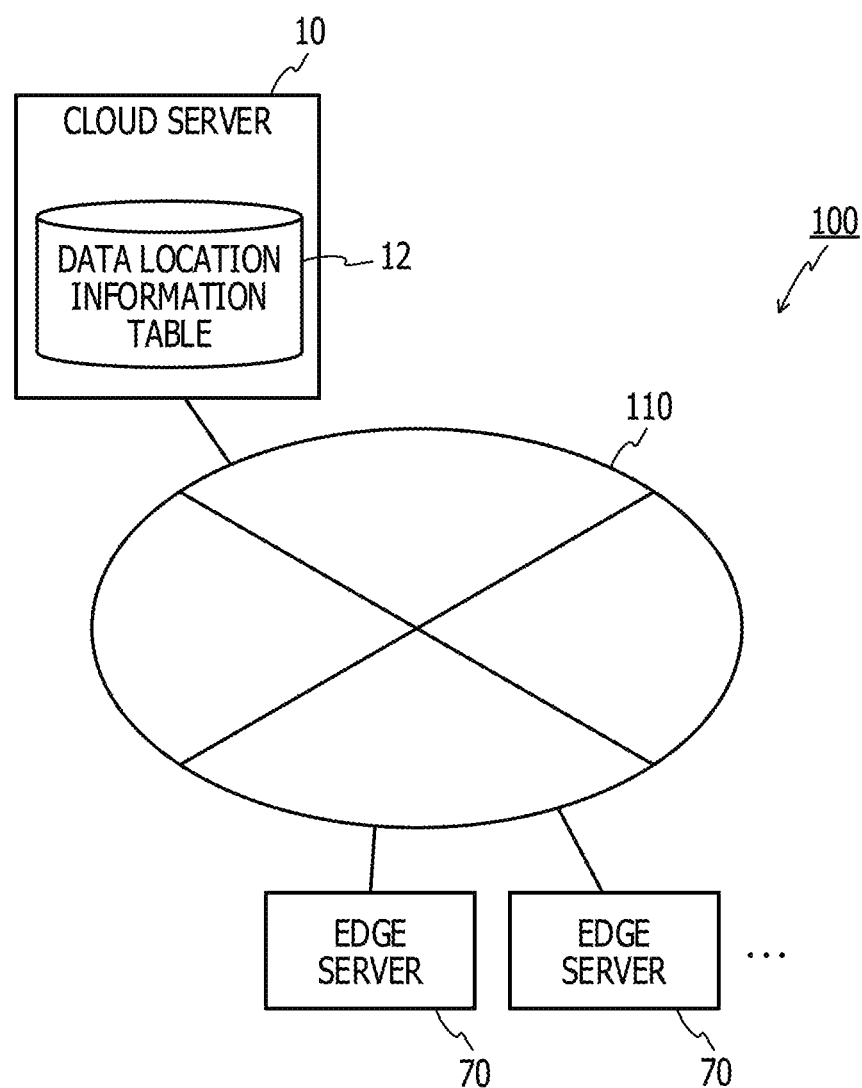
FIG. 21 is a drawing illustrating a configuration of the distributed processing system according to the first embodiment.

FIG. 21 schematically illustrates an apparatus configuration of a distributed processing system 100 according to the present first embodiment. As illustrated in FIG. 21, the distributed processing system 100 includes a cloud server 10 and a plurality of edge servers 70 serving as information processing apparatuses. The cloud server 10 and the plurality of edge servers 70 are coupled to a network 110 such as the internet.

Figure 22A:
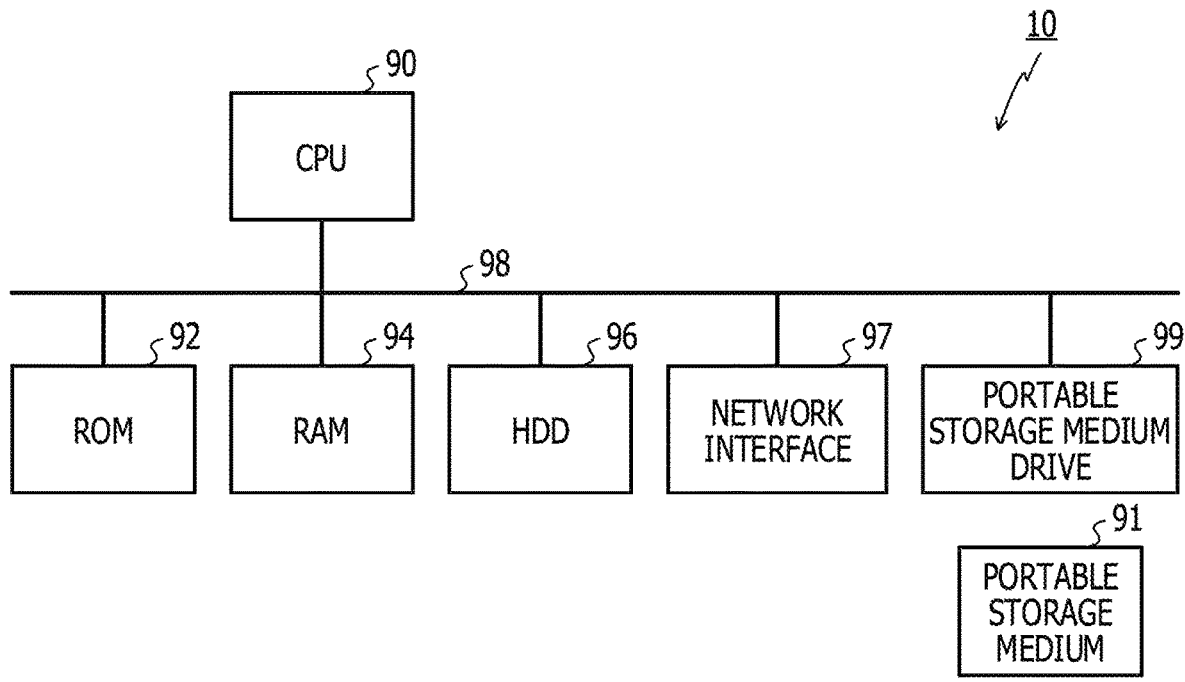
FIG. 22A illustrates a hardware configuration of a cloud server.

The cloud server 10 has a hardware configuration as illustrated in FIG. 22A. As illustrated in FIG. 22A, the cloud server 10 includes a central processing unit (CPU) 90, a read-only memory (ROM) 92, a random-access memory (RAM) 94, a storage unit (hard disk drive (HDD) in this case) 96, a network interface 97, and a portable storage medium drive 99 that may read data or a program stored in a portable storage medium 91. These respective components of the cloud server 10 are coupled to a bus 98. The cloud server 10 includes a data location information table 12 indicating the edge server 70 where the data is held in the HDD 96 or the like.

FIG. 23 illustrates a data structure of the data location information table 12. As illustrated in FIG. 23, "data ID", "data attribute", "data location", and "access statistics" are managed in the data location information table 12. The "data ID" is identification information for identifying data, and the "data attribute" is various attribute values of data. The "data location" is an array of a data access end point. The data access end point includes an edge server address, and also includes "true" when the data is the original data or "false"

in the case of the cache. The "access statistics" is the number of accesses per unit time to the data as the entire system.

The edge server 70 processes dynamic data of people and objects in accordance with a processing request from a terminal of a user and provides a processing result to the user.

Figure 22B:
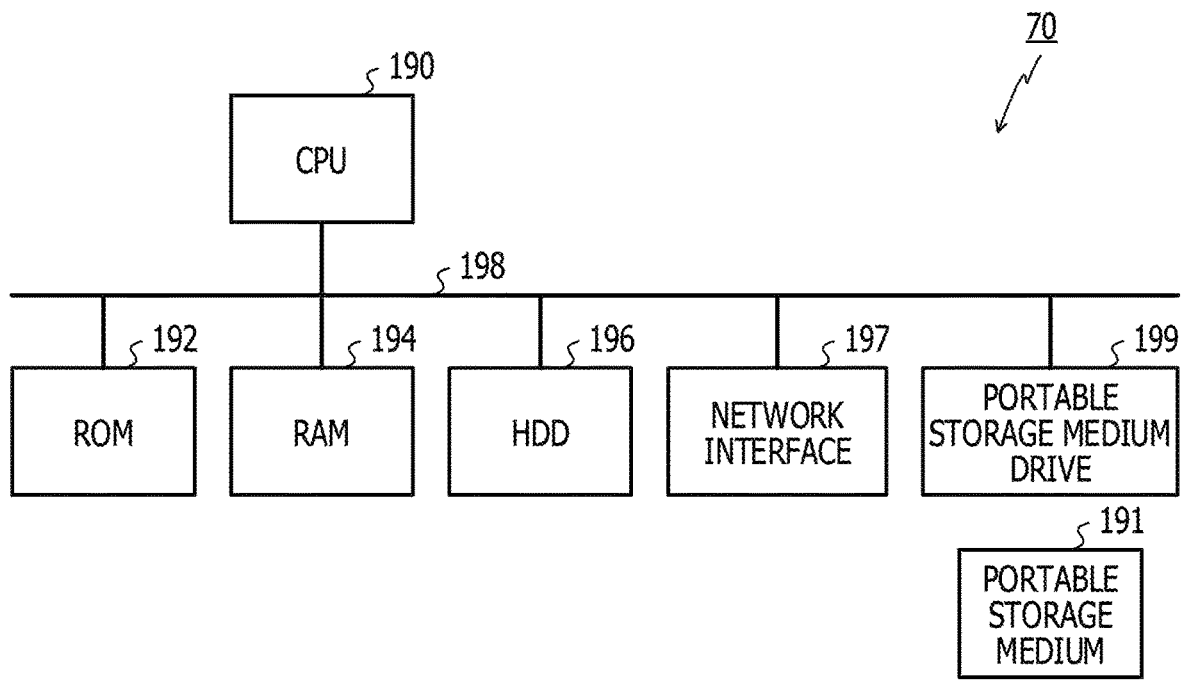
FIG. 22B illustrates a hardware configuration of the edge server.
Figure 24:
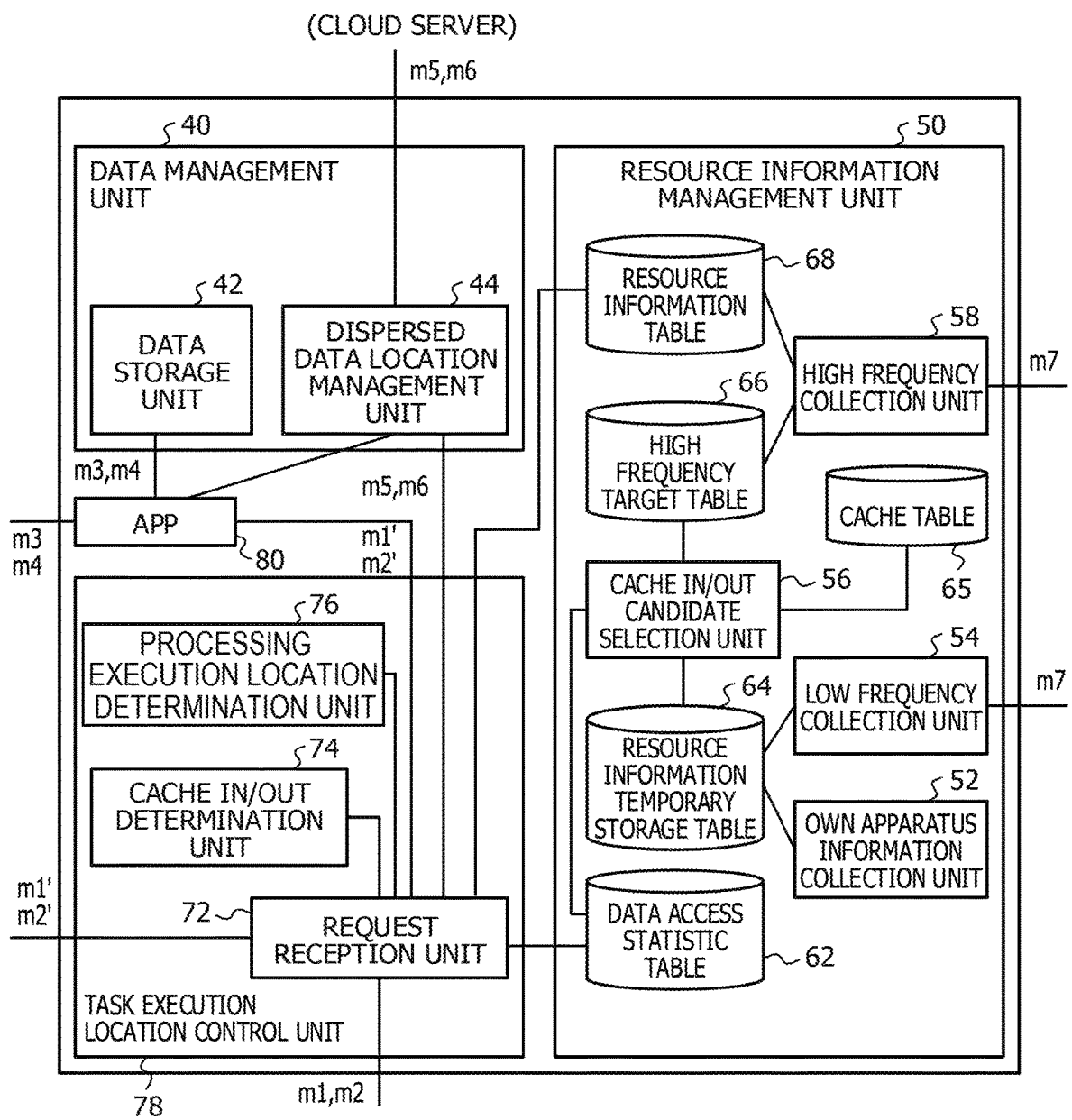
FIG. 24 is a functional block diagram of the edge server.

FIG. 22B illustrates a hardware configuration of the edge server 70. As illustrated in FIG. 22B, the edge server 70 includes, for example, a CPU 190, a ROM 192, a RAM 194, a storage unit (HDD) 196, a network interface 197, a portable storage medium drive 199, and the like similarly as in the cloud server 10. These respective components of the edge server 70 are coupled to a bus 198. In the edge server 70, functions of the respective units illustrated in FIG. 24 are realized when the CPU 190 executes programs (including a distributed processing program) stored in the ROM 192 or the HDD 196 or programs (including the distributed processing program) read by the portable storage medium drive 199 from the portable storage medium 191. The functions of the respective units illustrated in FIG. 24 may be realized by an integrated circuit, such as an application specific integrated circuit (ASIC) or a field-programmable gate array (FPGA), for example.

FIG. 24 is a functional block diagram of the edge server 70. As illustrated in FIG. 24, the edge server 70 functions as a data management unit 40, a resource information management unit 50, and a task execution location control unit 78 when the CPU 190 executes the programs. An app 80 execute data processing in the edge server 70.

The data management unit 40 includes a data storage unit 42 and a distributed data location management unit 44. The data storage unit 42 stores original data or stores cache. The distributed data location management unit 44 registers data stored in the data storage unit 42 in the data location information table 12 of the cloud server 10. The distributed data location management unit 44 refers to the data location information table 12 in accordance with a request from a request acceptance unit 72 or the app 80, and provides data location information used by the request acceptance unit 72 or the app 80.

The resource information management unit 50 includes an own apparatus information collection unit 52, a low frequency collection unit 54 serving as a first obtaining unit, a cache in/out candidate selection unit 56, and a high frequency collection unit 58 serving as a second obtaining unit.

The own apparatus information collection unit 52 collects load information of its own apparatus to be stored in a resource information temporary storage table 64. The low frequency collection unit 54 collects load information from the other edge servers 70 at a low frequency (every time T) to be stored in the resource information temporary storage table 64.

The resource information temporary storage table 64 has a data structure as illustrated in FIG. 25A. Specifically, for example, the resource information temporary storage table 64 stores an "edge server ID" corresponding to identification information of the edge server, and load information of the respective edge servers (Π: data processing capacity, Δ: data access capacity, n: data processing load total amount, and δ: data access load total amount).

The cache in/out candidate selection unit 56 executes processing for selecting cache-in candidate data and cache-out candidate data based on the resource information temporary storage table 64, a data access statistic table 62, and a cache table 65.

The data access statistic table 62 is a table for managing information related to data accesses (access history). Specifically, for example, as illustrated in FIG. 25B, the data access statistic table 62 manages an "access statistic of its own apparatus" and an "access statistic of the entire system" while being associated with the "data ID". The "access statistic of its own apparatus" is the number of processing requests of respective data per unit time which are accepted by the request acceptance unit 72 of its own apparatus. The "access statistic of the entire system" is the number of processing requests of respective data per unit time in the entire system. This access statistic of the entire system is an access statistic obtained when the request acceptance unit 72 makes a query to the distributed data location management unit 44 (access statistic of FIG. 23).

The cache table 65 is a table for managing the data cached in its own apparatus, and specifically, for example, as illustrated in FIG. 25C, a "path" and an "access statistic" are stored while being associated with the "data ID" of the cached data. The "path" means a path to the cache data over the file system, and the "access statistic" means the number of accesses to the cache data per unit time.

The cache in/out candidate selection unit 56 stores the information of the edge server 70 that holds the original data of the selected cache-in candidate data in a high frequency target table 66. The cache in/out candidate selection unit 56 also stores the information of the edge server 70 that holds the original data of the cache-out candidate data in the high frequency target table 66. The high frequency target table 66 is a table as illustrated in FIG. 26A, and manages the "edge server ID" corresponding to the identification information of the target edge server.

With reference to FIG. 24 again, the high frequency collection unit 58 collects the load information from the edge server that holds the original data of the cache-in candidate data and the edge server that holds the original data of the cache-out candidate data at a high frequency (every time T (T<T)). The high frequency collection unit 58 stores the load information collected at the high frequency in a resource information table 68.

Figures 26A, 26B:
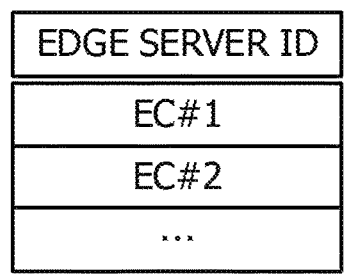
FIG. 26A is a drawing illustrating a high frequency target table.
FIG. 26B is a drawing illustrating a resource information table.

The resource information table 68 is a table as illustrated in FIG. 26B, and has a data structure similar to that of the above-described resource information temporary storage table 64.

With reference to FIG. 24 again, the task execution location control unit 78 includes the request acceptance unit 72, a cache in/out determination unit 74, and a processing execution location determination unit 76 as a selection unit.

The request acceptance unit 72 accepts the data processing request from the user terminal and notifies the cache in/out determination unit 74 of this.

The cache in/out determination unit 74 determines whether to cache in the data where the processing request is issued and cache out the other data (perform cache change) or to maintain the cache.

When the cache in/out determination unit 74 determines to perform the cache change, the processing execution location determination unit 76 determines its own apparatus as a processing execution location. When the cache in/out determination unit 74 determines not to perform the cache change, the processing execution location determination unit 76 determines any one of the edge servers 70 that is to execute the data processing. The processing execution location determination unit 76 notifies the request acceptance unit 72 of the determination result, and the request acceptance unit 72 notifies the notified processing execution location (the app 80 of its own apparatus or the other edge server 70) of a message of a processing execution request.

When the message of the processing execution request is received from the request acceptance unit 72 of its own apparatus or the other edge server 70, the app 80 executes the processing in accordance with the received message.

According to the present embodiment, with regard to respective functions of the edge server 70, as illustrated in FIG. 24, messages (m1 to m9, m1', and m2') are exchanged between the functions within the edge server 70, with the other edge server, with the cloud server 10, and with the user terminal. FIG. 27 to FIG. 30 illustrate examples of structures of the exchanged messages.

FIG. 27A illustrates the structure of the message (m1) of the app processing request transmitted from the user terminal to the request acceptance unit 72. As illustrated in FIG. 27A, the message m1 includes a destination address (address of the edge server 70), a transmission source address (address of a terminal), an app path, and a body in which processing target data and processing contents are described.

FIG. 27B illustrates the structure of the message (m2) of an app processing response returned by the request acceptance unit 72 to the terminal. As illustrated in FIG. 27B, the message m2 includes a destination address (address of the terminal), a transmission source address (address of the edge server 70), an app path, and a processing response indicating a processing result.

FIG. 28A illustrates the structure of the message (m1') of the app processing request transmitted by the request acceptance unit 72 to the app in its own apparatus or the other edge servers 70. This message m1' has a similar structure to that of the above-described message m1, but is different from the message m1 in contents of the destination address and the transmission source address.

FIG. 28B illustrates the structure of the message (m2') of the app processing response received by the request acceptance unit 72 from the transmission destination of the message m1'. This message m2' has a similar structure to that of the above-described message m2, but is different from the message m2 in contents of the destination address and the transmission source address.

FIG. 29A illustrates the structure of the message (m3) of the data obtaining request transmitted by the app 80 to the data storage unit 42 in its own apparatus or the other edge servers 70. This message m3 includes a destination address, a transmission source address, and a body in which a name (DB name) of a database that stores data and a data request query are described.

FIG. 29B illustrates the structure of the message (m4) of the data obtaining response received by the app 80 from the transmission destination of the message m3. This message m4 includes a destination address, a transmission source address, and the data requested by the app 80.

FIG. 30A illustrates the structure of the message (m5) of the data/cache location request that is transmitted from the request acceptance unit 72 to the distributed data location management unit 44 and also transmitted from the distributed data location management unit 44 to the cloud server 10. This message m5 includes a destination address, a transmission source address, and a body in which a location request query of the data or cache is described.

FIG. 30B illustrates the structure of the message (m6) of the data/cache location response that is transmitted from the cloud server 10 to the distributed data location management unit 44 and also transmitted from the distributed data location management unit 44 to the request acceptance unit 72. This message m6 includes a destination address, a transmission source address, and location information (data location) of the data or cache identified by the cloud server 10.

FIG. 30C illustrates the structure of the message (m7) of the resource information exchange transmitted from the other edge servers 70 when the low frequency collection unit 54 or the high frequency collection unit 58 obtains the load information of the other edge servers 70. This message m7 includes a destination address, a transmission source address, and a body in which the load information of the other edge servers 70 at the transmission sources is described.

(Regarding Processing of Edge Server 70)

Next, the processing of the edge server 70 will be described in detail with reference to flowcharts in FIGS. 31 to 34. According to the present first embodiment, the edge server 70 executes the low frequency processing executed at a low frequency (FIG. 31), the high frequency processing executed at a high frequency (FIG. 32), and the request execution processing executed in accordance with the processing request from the user (FIG. 33, FIG. 34) in parallel.

(Low Frequency Processing)

Hereinafter, the low frequency processing will be described in detail with reference to FIG. 31.

Figure 31:
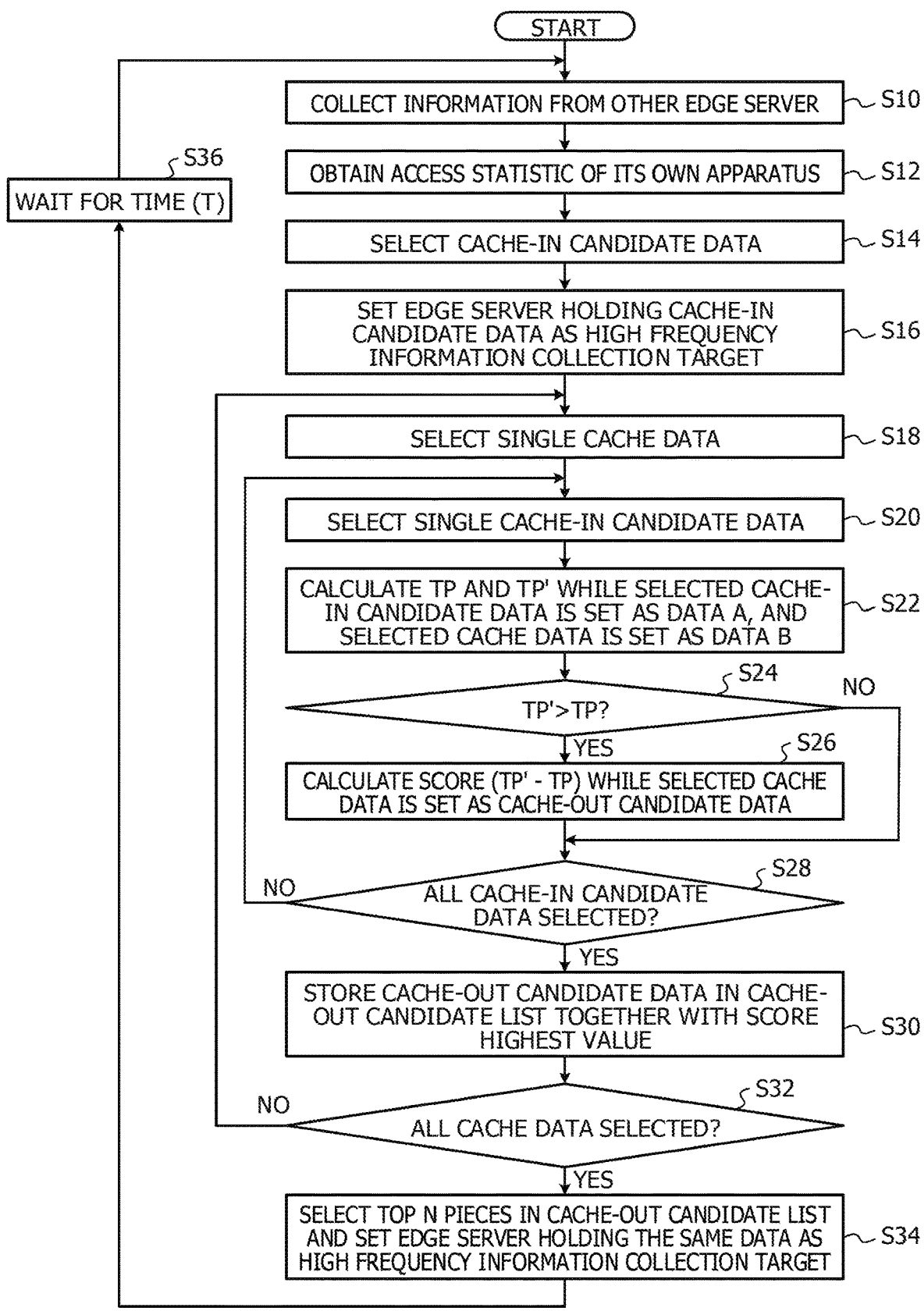
FIG. 31 is a flowchart illustrating low frequency processing.

In the processing in FIG. 31, first, in step S10, the low frequency collection unit 54 performs information collection from the other the edge servers 70 coupled to the network 110. In this case, the low frequency collection unit 54 obtains the data processing load total amount ($\pi$), the data access load total amount ($\delta$), the data processing capacity ($\Pi$), and the data access capacity ($\Delta$) of the other the edge servers 70 by obtaining the message m7 (FIG. 30C) from the other the edge servers 70.

Next, in step S12, the cache in/out candidate selection unit 56 obtains the access statistic of its own apparatus from the data access statistic table 62 (FIG. 25B).

Next, in step S14, the cache in/out candidate selection unit 56 selects the cache-in candidate data based on the access statistic of its own apparatus. Specifically, for example, the cache in/out candidate selection unit 56 selects data having accesses equal to or more than a predetermined reference and also is not stored in the cache table 65 as the cache-in candidate.

Next, in step S16, the cache in/out candidate selection unit 56 sets the edge server 70 that holds the cache-in candidate data (original data) as the high frequency information collection target. The cache in/out candidate selection unit 56 stores the information of the edge server 70 set as the high frequency information collection target in the high frequency target table 66 (FIG. 26A).

Next, in step S18, the cache in/out candidate selection unit 56 selects one piece of the cache data from the cache table 65 that stores the cache data in its own apparatus (FIG. 25C).

Next, in step S20, the cache in/out candidate selection unit 56 selects one piece of the cache-in candidate data selected in step S14.

Next, in step S22, the cache in/out candidate selection unit 56 calculates TP and TP' based on the above-described Expressions (7) and (8) while the selected cache-in candidate data is set as data A, and the selected cache data is set as data B. TP is the processing throughput when cache of the data B is maintained and the data A is not cached (when cache is maintained), and TP' is the processing throughput when the data A is cached instead of the data B (when cache is changed).

Next, in step S24, the cache in/out candidate selection unit 56 determines whether or not TP' is higher than TP (TP'>TP?). When the determination in this step S24 is affirmative, for example, when the processing throughput is higher by changing the cache, the process proceeds to step S26.

When the process proceeds to step S26, the cache in/out candidate selection unit 56 sets the selected cache data as the cache-out candidate data and calculates a store (TP'−TP). Thereafter, the process proceeds to step S28.

When the determination in this step S24 is negative, for example, when the processing throughput is higher by maintaining the cache, the process proceeds to step S28 by skipping step S26.

When the process proceeds to step S28, the cache in/out candidate selection unit 56 determines whether or not all of the cache-in candidate data are selected. When the determination in this step S28 is negative, the process returns to step S20. Until the determination in step S28 becomes affirmative, the processing and determination in steps S20 to S28 are repeated. Thus, whether or not each cache-in candidate data (data A) becomes the cache-out candidate data is determined while the cache data (data B) is fixed, and when the data becomes the cache-out candidate data, the score (TP'−TP) may be calculated.

Thereafter, when the determination in step S28 is affirmative, the process proceeds to step S30.

When the process proceeds to step S30, the cache in/out candidate selection unit 56 stores the cache-out candidate data in the held cache-out candidate list together with the highest value of the score.

Next, in step S32, the cache in/out candidate selection unit 56 determines whether or not all of the cache data are selected. When the determination in this step S32 is negative, the process returns to step S18. Until the determination in step S32 becomes affirmative, the processing and determination in steps S18 to S30 are repeated. Thus, whether or not the data becomes the cache-out candidate data is determined regarding all the cache data, and when the data becomes the cache-out candidate data, the data is stored together with the highest value of the score (TP'−TP).

Thereafter, when the determination in step S32 is affirmative, the process proceeds to step S34.

When the process proceeds to step S34, the cache in/out candidate selection unit 56 selects top N pieces in the cache out candidate list, and sets the edge server 70 that holds the original data of the same data as the high frequency information collection target. The cache in/out candidate selection unit 56 stores the information of the edge server 70 set as the high frequency information collection target in the high frequency target table 66 (FIG. 26A).

Next, in step S36, the low frequency collection unit 54 waits for a time (T). This time T is a predetermined cycle period for repeating the processing in steps S10 to S34 at a low frequency.

Thereafter, the process returns to step S10, and the processing in steps S10 to S34 is repeatedly executed for every time T (at a low frequency).

(High Frequency Processing)

Next, the high frequency processing will be described along the flowchart in FIG. 32.

Figure 32:
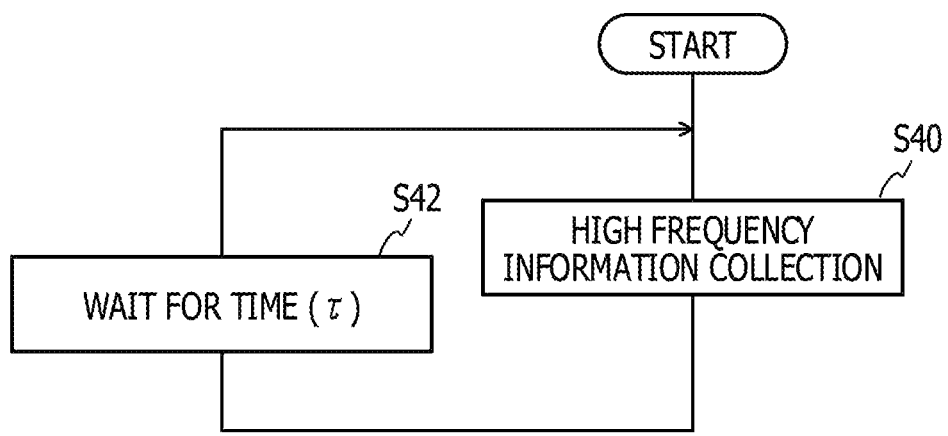
FIG. 32 is a flowchart illustrating high frequency processing.

In the processing of FIG. 32, first, in step S40, the high frequency collection unit 58 refers to the high frequency target table 66 to identify the edge server 70 of the high frequency information collection target, and collects the resource information of the identified edge server 70. The high frequency collection unit 58 stores the collected resource information in the resource information table 68 (FIG. 26B).

Next, in step S42, the high frequency collection unit 58 waits for a time (T). This timer is a time shorter than the above-described time T, and is a predetermined cycle period at a high frequency.

After step S42, the process returns to step S40. In other words, in the processing in FIG. 32, the processing in step S40 is repeatedly executed for every time (at a high frequency).

(Request Execution Processing)

Next, the request execution processing will be described in detail along the flowchart in FIG. 33 and FIG. 34.

Figure 33:
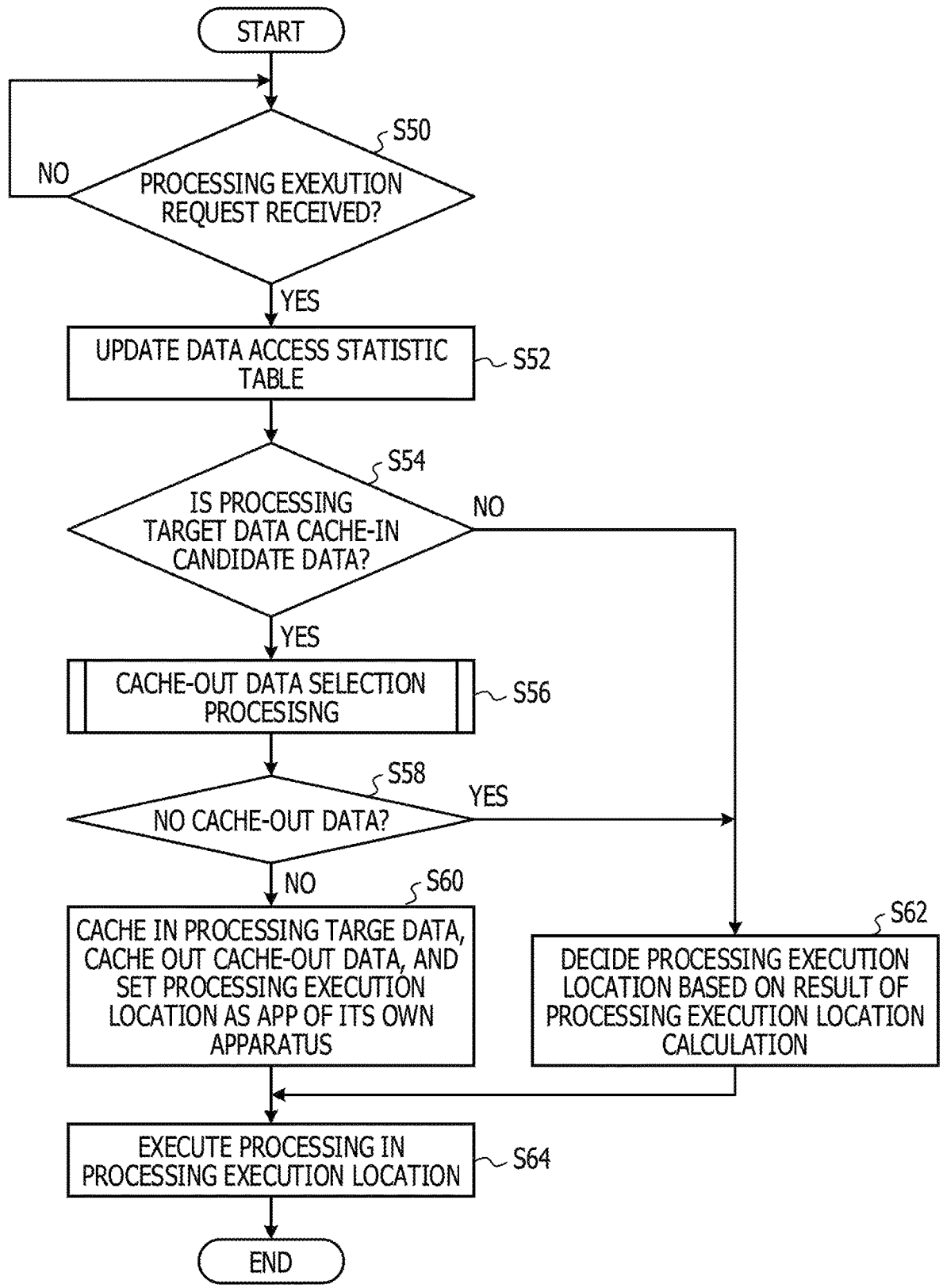
FIG. 33 is a flowchart illustrating request execution processing.

In the processing in FIG. 33, first, in step S50, the request acceptance unit 72 waits until the processing execution request is received from the user terminal. When the processing execution request is issued from the terminal, the process proceeds to step S52, and the request acceptance unit 72 updates the data access statistic table 62.

Next, in step S54, the request acceptance unit 72 determines whether or not the target data is the cache-in candidate data. In this case, similarly as in the above-described processing of the cache in/out candidate selection unit 56 in step S14, the request acceptance unit 72 refers to the data access statistic table 62 to select the cache-in candidate data, and determines whether or not the target data is the cache-in candidate data.

When the determination in step S54 is affirmative, the process proceeds to step S56, but when the determination is negative, the process proceeds to step S62.

When the determination in step S54 is affirmative and the process proceeds to step S56, a subroutine of the cache-out data selection processing is executed. In this cache-out data selection processing, the processing along the flowchart in FIG. 34 is executed.

Figure 34:
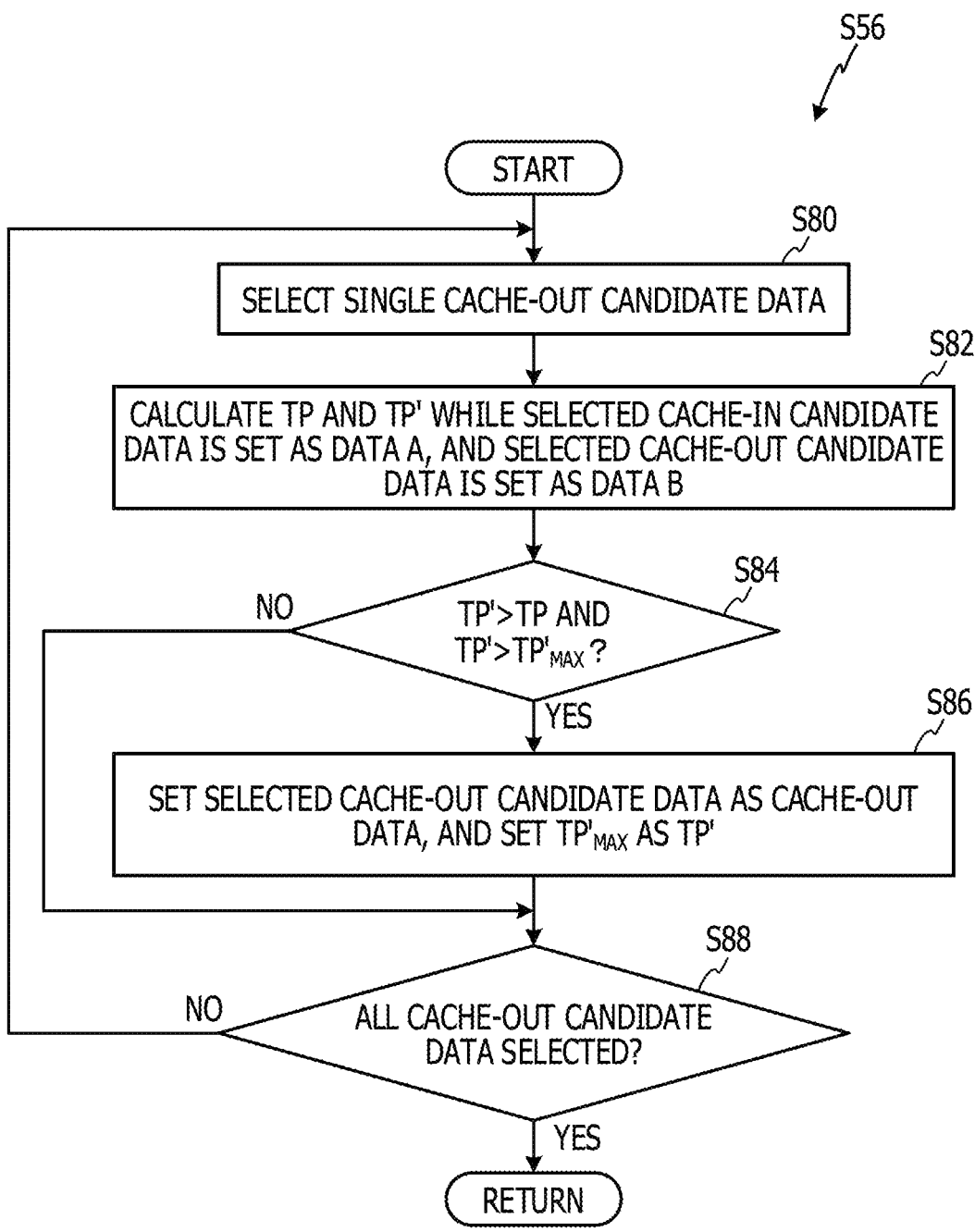
FIG. 34 is a flowchart illustrating processing in step S56 of FIG. 33.

In the processing in FIG. 34, first, in step S80, the request acceptance unit 72 selects one piece of the cache-out candidate data. It is assumed that the request acceptance unit 72 obtains the information of the cache-out candidate data selected by the cache in/out candidate selection unit 56, and selects one piece from among the cache-out candidate data.

Next, in step S82, the request acceptance unit 72 calculates TP and TP' based on the data of the resource information table 68 while the selected cache-in candidate data is set as data A, and the selected cache-out candidate data is set as data B. The above-described Expressions (7) and (8) are used in this calculation. TP is the processing throughput when the cache of the data B is maintained and the data A is not cached (when the cache is maintained), and TP' is the processing throughput when the data A is cached instead of the data B (when the cache is changed). The request acceptance unit 72 transmits the calculated TP and TP' to the cache in/out determination unit 74.

Next, in step S84, the cache in/out determination unit 74 determines whether or not. TP' is higher than TP and also TP' is higher than TP'$_{MAX}$. TP'$_{MAX}$ is set as a value where an initial value is 0. In a case where this determination in step S84 is affirmative, the process proceeds to step S86.

When the process proceeds to step S86, the cache in/out determination unit 74 sets the selected cache-out candidate data as the cache-out data, and sets TP' as TP'$_{MAX}$. Thereafter, the process proceeds to step S88.

On the other hand, when the determination in step S84 is negative, the process proceeds to step S88 by skipping step S86.

When the process proceeds to step S88, the request acceptance unit 72 determines whether or not all of the cache-out candidate data are selected. When this determination in step S88 is negative, the process returns to step S80, and until the determination in step S88 becomes affirmative, the processing and determination in steps S80 to S88 are repeatedly executed.

When the determination in step S88 is affirmative, all of the processing in FIG. 34 are completed, and the procedure proceeds to step S58 in FIG. 33.

When the process proceeds to step S58, the cache in/out determination unit 74 determines whether or not the cache-out data exists. When the determination in this step S58 is negative, for example, when the cache-out data exists, the process proceeds to step S60. On the other hand, when the determination in this step S58 is affirmative, for example, when the cache-out data does not exist, the process proceeds to step S62.

When the determination in this step S58 is negative and the process proceeds to step S60, the cache in/out determination unit 74 caches in the processing target data and caches out the cache-out data. The processing execution location determination unit 76 sets the processing execution location as the app of its own apparatus. Thereafter, the process proceeds to step S64, and the request acceptance unit 72 transmits the message m1' to the processing execution location (app 80 of its own apparatus) to cause the app 80 to execute the processing.

On the other hand, when the process proceeds to step S62, the processing execution location determination unit 76 determines the processing execution location based on the result of the processing execution location calculation. Specifically, for example, the processing execution location determination unit 76 determines the processing execution location where the time until the processing is completed becomes the minimum by the method described using the above-described Expression (1). In this case, the processing execution location is determined based on which one the edge servers 70 holds the data where the processing execution request is issued. When the process proceeds to step S64, the request acceptance unit 72 transmits the message m1' to the determined processing execution location to execute the processing.

As described above, when the processing in step S64 is executed, all the processing in FIG. 33 are ended. The processing in FIG. 33 is repeatedly executed.

As may be apparent from the aforementioned explanations, according to the present first embodiment, functions of a storage candidate identification unit that identifies the cache-in candidate data and a deletion candidate identification unit that identifies the cache-out candidate data are realized by the cache in/out candidate selection unit 56. According to the present first embodiment, a function as a determination unit that determines whether to maintain the cache or change the cache by the request acceptance unit 72 and the cache in/out determination unit 74.

Figure 35:
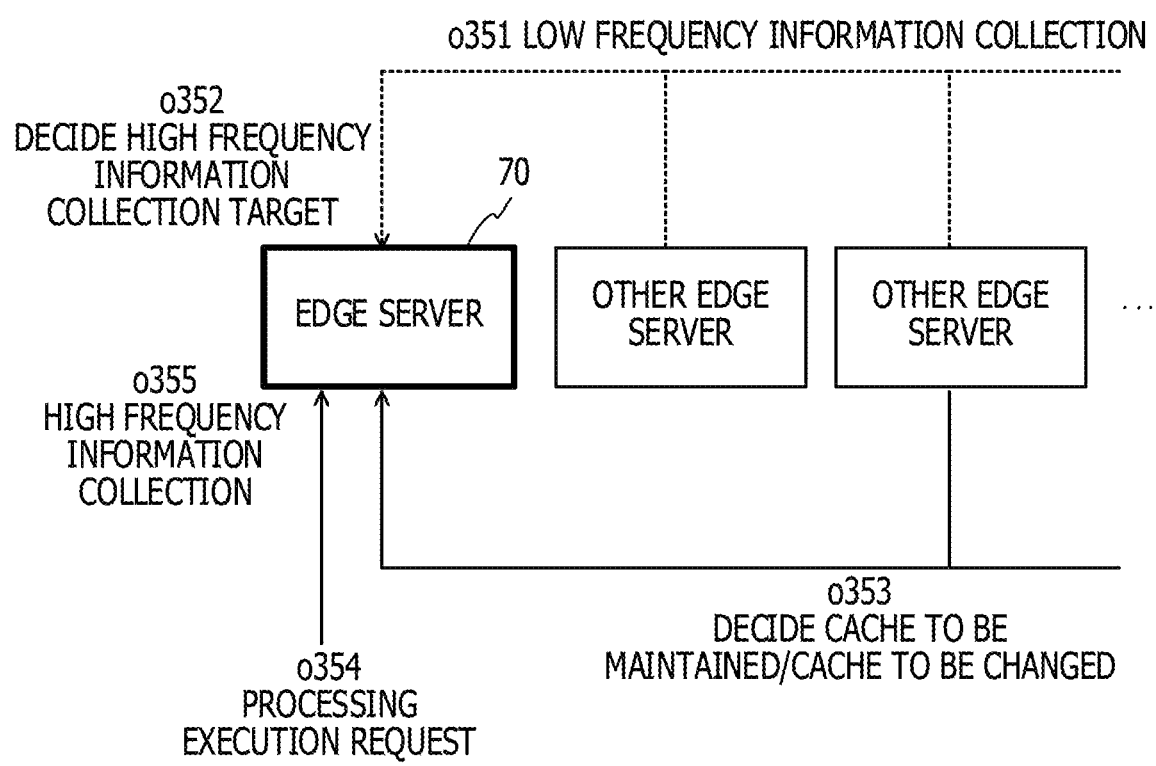
FIG. 35 is a drawing illustrating processing according to the first embodiment.

As described above in detail, according to the present first embodiment, the cache in/out candidate selection unit 56 identifies the cache-in candidate data based on the data access statistic table 62 that stores the access history to the data in the past and the cache table 65. The low frequency collection unit 54 obtains the load information from the other edge servers 70 for every time T (at a low frequency). The cache in/out candidate selection unit 56 identifies the cache-out candidate data from among the cache data based on the load information of the other edge servers 70 and the load information of its own apparatus stored in the resource information temporary storage table 64. The high frequency collection unit 58 obtains the load information of the other edge servers 70 that hold the cache-in candidate data or the cache-out candidate data for every time T (at a high frequency). When the processing request of the cache-in candidate data is issued, the request acceptance unit 72 and the cache in/out determination unit 74 determine whether to maintain or change the cache based on the load information of the other edge servers 70 and the load information of its own apparatus that are obtained at a high frequency. In this manner, according to the present embodiment, as illustrated in FIG. 35, the edge server 70 collects the load information from the other edge servers at a low frequency (o351) and uses the collected information (o352) to determine (narrows down) the target other edge servers where the load information is collected at a high frequency. The edge server 70 collects the load information at a high frequency only from the determined (narrowed-down) edge servers (o353). When the processing execution request is issued (o354), the edge server 70 determines whether to maintain the cache or change the cache by using the load information collected at a high frequency (o355). Therefore, according to the present embodiment, since whether to maintain the cache or change the cache may be appropriately determined without collecting the load information at a high frequency from all the edge servers, the traffic amount may be reduced. Since a query about the load information is not performed with respect to the edge server after the processing execution request is issued to reduce the traffic amount, service response may be set to be satisfactory.

According to the present first embodiment, the cache in/out candidate selection unit 56 compares the processing throughput when the cache data is maintained with the processing throughput when the cache-in candidate data is changed as the cache data (S22). When the processing throughput is higher by changing the cache data, the cache in/out candidate selection unit 56 sets the cache data as the cache-out candidate data. Thus, the appropriate cache data may be selected as the cache-out candidate data.

According to the present first embodiment, when the cache is not changed (S54: negative, S58: affirmative), the processing execution location determination unit 76 determines the processing execution location based on the result of the processing execution location calculation (S62). Thus, the processing may be performed in the edge server 70 where the processing time is short.

Second Embodiment

Next, a second embodiment will be described with reference to FIG. 36. According to the present second embodiment, each edge server holds information (data location information) indicating which edge server holds which data.

Figure 36:
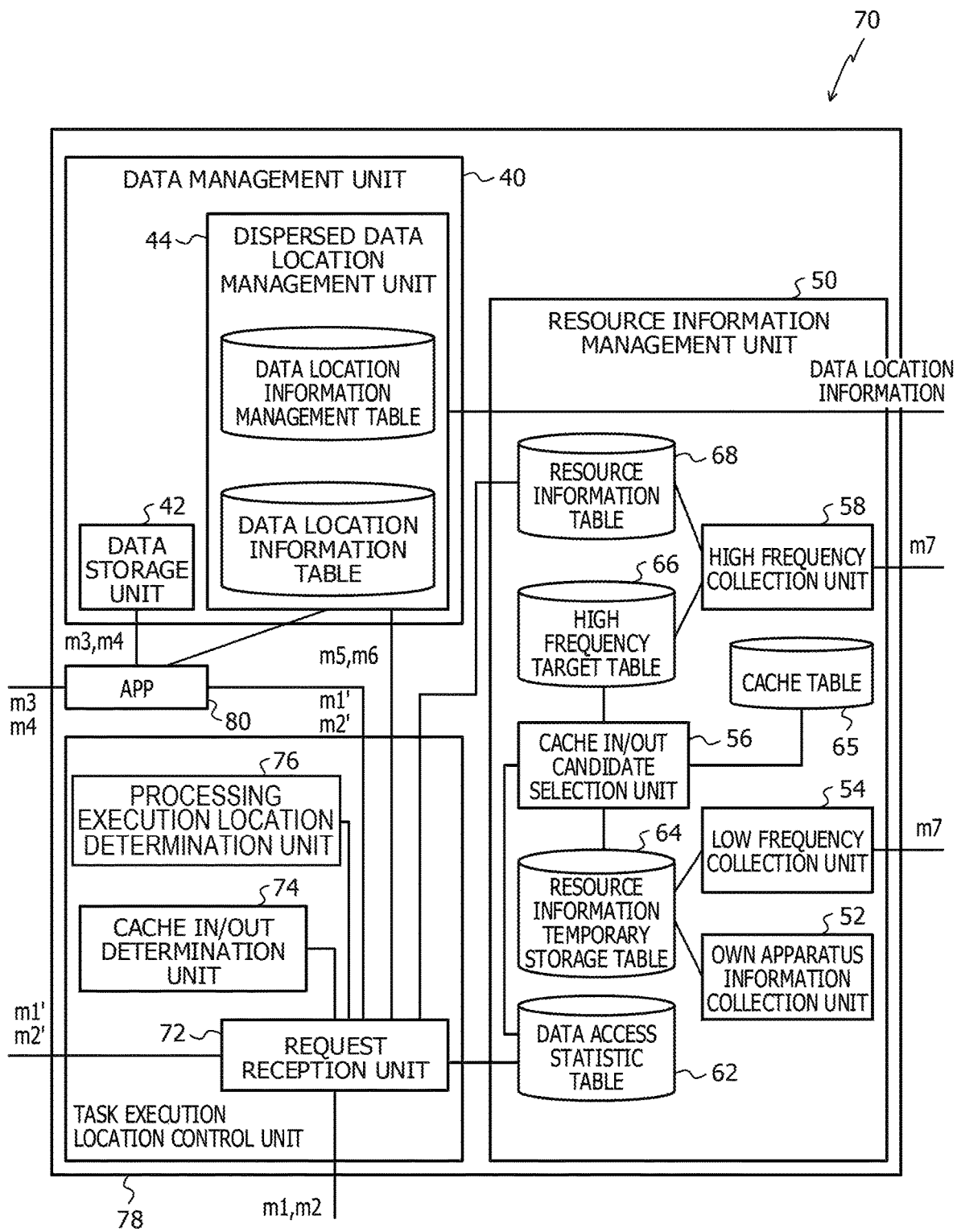
FIG. 36 is a functional block diagram of the edge server according to a second embodiment.

FIG. 36 is a functional block diagram of the edge server 70 according to the present second embodiment. As illustrated in FIG. 36, the present second embodiment is different from the first embodiment (FIG. 24) in that the distributed data location management unit 44 includes a data location information management table and a data location information table. The data location information table is a table as illustrated in FIG. 23 described according to the first embodiment, but each edge server does not hold location information of all data. For this reason, the distributed data location management unit 44 manages information of the edge server to which a query is made about location information of data that is not managed in its own apparatus in the data location information management table.

FIG. 37 illustrates a data structure of the data location information management table. As illustrated in FIG. 37, a data ID of the data the location information of which is not managed in its own apparatus and identification information of the edge server that manages the location information of the data (ID of the edge server in charge of the management) are stored in the data location information management table while being associated with each other.

Thus, without managing the location information of the data in the cloud server 10 as in the first embodiment, distributed management of the location information of the data may be performed in the edge servers 70.

To perform the distributed management of the location information of the data among the edges, efficiency may be promoted using a distributed hash table (DHT).

According to the above-described respective embodiments, the cache in/out candidate selection unit 56 may calculate a correlation relationship between the load information of its own apparatus and the load information of the other respective edge servers using the load information of the edge servers 70 (its own apparatus and the other edge servers) collected at a low frequency.

For example, when the data processing load total amount of its own apparatus is set as $\pi_i$, and the data access load total amount is set as $\delta_i$, the data processing load total amount $\pi_s$ and the data access load total amount $\delta_s$ of other edge server s are represented by the following Expressions (9) and (10).

$$\pi_s = \alpha^{\pi}_s \times \pi_i + \beta^{\pi}_s \quad (9)$$

$$\delta_s = \alpha^{\delta}_s \times \delta_i + \beta^{\delta}_s \quad (10)$$

In this case, the cache in/out candidate selection unit 56 performs statistical processing of the load information of its own apparatus and the load information of the edge servers s to obtain $\alpha^{\pi}_s$, $\alpha^{\delta}_s$ and $\beta^{\pi}_s$, $\beta^{\delta}_s$ as the correlation relationship.

The cache in/out candidate selection unit 56 may estimate the load information of the other respective edge servers at a certain time point based on the load information of its own apparatus at the certain time point and the above-described Expressions (9) and (10). Therefore, the cache in/out candidate selection unit 56 may select the cache-out candidate data based on the estimated load information of the edge servers at the certain time point.

Thus, the collection frequency of the load information of the other edge servers 70 which has been the low frequency may be further decreased.

The above-described processing functions may be realized by a computer. In this case, there is provided a program in which the processing contents of the functions which a processing apparatus is supposed to have are described. The above-described processing functions are realized in the computer when the computer executes the program. The program in which the processing contents are described may be recorded in a computer-readable storage medium (except for a carrier wave).

To distribute the program, a portable storage medium such as a digital versatile disc (DVD), a compact disc read-only memory (CD-ROM), or the like storing the program is marketed, for example. The program may be stored in a storage device of a server computer and transferred from the server computer to another computer through a network.

For example, the computer which executes the program stores the program recorded in the portable storage medium or the program transferred from the server computer in its own storage device. The computer reads the program from its own storage device and executes processes in accordance with the program. The computer may read the program directly from the portable storage medium and execute the processes in accordance with the program. Every time the program is transferred from the server computer to the computer, the computer may sequentially execute the processes in accordance with the program.

The above-described embodiments are examples of a preferred embodiment. The embodiments are not limited thereto, and various modifications may be made without departing from the spirit of the present disclosure.

According to an aspect of the embodiments, the reduction of the traffic amount in the information collection for performing the determination regarding the temporary storage of the accessed data may be realized.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising: a memory; and a processor coupled to the memory and the processor configured to: identify first data based on an access history of accessing data, the first data being a candidate of data to be temporarily stored in the memory; obtain first load information from other apparatuses at a first time interval; identify second data based on the first load information and second load information of the information processing apparatus, the second data being temporarily stored in the memory and being a candidate of data to be deleted from the memory; obtain third load information from a first apparatus that holds the first data and one or more second apparatuses that hold respective pieces of the second data at a second time interval shorter than the first time interval; determine, when the first data is accessed, whether the first data is to be temporarily stored in the memory and which piece of the second data is to be deleted when temporarily storing the first data in the memory, based on the third load information and the second load information; and determine in which case a throughput of processing the first data is higher between a first case where the first data is stored in the memory in place of data currently stored in the memory and a second case where the first data is not stored in the memory; and identify the second data when the throughput is higher in the first case.

2. The information processing apparatus according to claim 1, wherein
  the processor is further configured to:
  calculate a correlation relationship between the first load information and the second load information based on the first load information and the second load information;
  estimate load information of the other apparatuses based on the correlation relationship and the second load information; and
  identify the second data by using the estimated load information.

3. The information processing apparatus according to claim 1, wherein
  the processor is further configured to:
  select, when it is determined that the first data is not to be temporarily stored in the memory, an apparatus that is to execute processing of the first data, based on load information of the other apparatuses and information of the first apparatus that holds the first data.

4. A distributed processing system, comprising: a plurality of information processing apparatuses coupled to each other via a network, wherein each of the plurality of information processing apparatuses includes: a memory; and a processor coupled to the memory and the processor configured to: identify first data based on an access history of accessing data, the first being a candidate of data to be temporarily stored in the memory; obtain first load information from other apparatuses of the plurality of information processing apparatuses at a first time interval; identify second data based on the first load information and second load information of the each of the plurality of information processing apparatuses, the second data being temporarily stored in the memory and being a candidate of data to be deleted from the memory; obtain third load information from a first apparatus that holds the first data and one or more second apparatuses that hold respective pieces of the second data at a second time interval shorter than the first time interval; determine, when the first data is accessed, whether the first data is to be temporarily stored in the memory and which piece of the second data is to be deleted when temporarily storing the first data in the memory, based on the third load information and the second load information; and determine in which case a throughput of processing the first data is higher between a first case where the first data is stored in the memory in place of data currently stored in the memory and a second case where the first data is not stored in the memory; and identify the second data when the throughput is higher in the first case.

5. A non-transitory computer-readable recording medium having stored therein a program that causes a computer to execute a process, the process comprising: identifying first data based on an access history of accessing data, the first data being a candidate of data to be temporarily stored in a memory; obtaining first load information from other apparatuses at a first time interval; identifying second data based on the first load information and second load information of the computer, the second data being temporarily stored in the memory and being a candidate of data to be deleted from the memory; obtaining third load information from a first apparatus that holds the first data and one or more second apparatuses that hold respective pieces of the second data at a second time interval shorter than the first time interval; determining, when the first data is accessed, whether the first data is to be temporarily stored in the memory and which piece of the second data is to be deleted when temporarily storing the first data in the memory, based on the third load information and the second load information; and determining in which case a throughput of processing the first data is higher between a first case where the first data is stored in the memory in place of data currently stored in the memory and a second case where the first data is not stored in the memory; and identify the second data when the throughput is higher in the first case.

6. The non-transitory computer-readable recording medium according to claim 5, the process further comprising:

calculating a correlation relationship between the first load information and the second load information based on the first load information and the second load information; and estimating load information of the other apparatuses based on the correlation relationship and the second load information; and identifying the second data by using the estimated load information.

7. The non-transitory computer-readable recording medium according to claim 5, the process further comprising:

selecting, when it is determined that the first data is not to be temporarily stored in the memory, an apparatus that is to execute processing of the first data, based on load information of the other apparatuses and information of the first apparatus that holds the first data.

* * * * *